US011193912B2

(12) United States Patent
Kimura

(10) Patent No.: US 11,193,912 B2
(45) Date of Patent: Dec. 7, 2021

(54) ULTRASONIC MEASUREMENT APPARATUS AND ULTRASONIC MEASUREMENT METHOD

(71) Applicant: MITSUBISHI ELECTRIC CORPORATION, Tokyo (JP)

(72) Inventor: Tomonori Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 329 days.

(21) Appl. No.: 16/079,964

(22) PCT Filed: Jan. 31, 2017

(86) PCT No.: PCT/JP2017/003394
§ 371 (c)(1),
(2) Date: Aug. 24, 2018

(87) PCT Pub. No.: WO2017/150046
PCT Pub. Date: Sep. 8, 2017

(65) Prior Publication Data
US 2020/0141906 A1    May 7, 2020

(30) Foreign Application Priority Data
Mar. 1, 2016   (WO) .................. PCT/JP2016/056262

(51) Int. Cl.
*G01N 29/04* (2006.01)
*G01N 29/24* (2006.01)
*G01N 29/38* (2006.01)

(52) U.S. Cl.
CPC ....... *G01N 29/041* (2013.01); *G01N 29/2487* (2013.01); *G01N 29/38* (2013.01);
(Continued)

(58) Field of Classification Search
CPC .. G01N 29/041; G01N 29/2487; G01N 29/38; G01N 29/48; G01N 2291/0258;
(Continued)

(56) References Cited

U.S. PATENT DOCUMENTS 5,629,485 A * 5/1997 Rose ...................... B64D 15/20
73/170.26
5,804,727 A * 9/1998 Lu ............................ G01H 5/00
73/159
(Continued)

FOREIGN PATENT DOCUMENTS

EP  2 889 613 A1  7/2015
JP  52-4198 B2  2/1977
(Continued)

OTHER PUBLICATIONS

International Search Report for PCT/JP2016/056262 (PCT/ISA/210) dated May 24, 2016.
(Continued)

*Primary Examiner* — Alexander A Mercado
(74) *Attorney, Agent, or Firm* — Birch, Stewart, Kolasch & Birch, LLP

(57) ABSTRACT

An ultrasonic measurement apparatus (1) estimates a property/state of a test object (100) that allows an injected ultrasonic wave to propagate as plate waves (UW) of propagation modes. The ultrasonic measurement apparatus (1) includes: a receiver (30) configured to receive a detected signal obtained by detecting the plate waves (UW) propagating through the test object (100) to output a received signal indicating a time-domain waveform of the detected signal; an intensity detector (12) configured to detect the signal intensity of a waveform part corresponding to a first propagation mode, and the signal intensity of a waveform part corresponding to a second propagation mode; and an estimator (13) configured to make a comparison between the
(Continued)

signal intensities to estimate a property/state of the test object (100) on the basis of a result of the comparison.

12 Claims, 27 Drawing Sheets

(52) U.S. Cl.
CPC .............. *G01N 2291/0258* (2013.01); *G01N 2291/0427* (2013.01)

(58) Field of Classification Search
CPC ... G01N 2291/0427; G01N 2291/0231; G01N 2291/0289; G01N 2291/102
See application file for complete search history.

(56) References Cited

U.S. PATENT DOCUMENTS

| | | | |
|---|---|---|---|
| 6,393,384 B1* | 5/2002 | Anthony | G01N 29/11 356/432 |
| 8,499,632 B1* | 8/2013 | Ihn | G01N 29/348 73/587 |
| 8,707,787 B1* | 4/2014 | Sohn | G01N 29/4418 73/602 |
| 2004/0003662 A1 | 1/2004 | Kenderian et al. | |
| 2007/0157730 A1 | 7/2007 | Ochiai et al. | |
| 2008/0255778 A1* | 10/2008 | Liu | G01N 29/36 702/35 |
| 2008/0255804 A1* | 10/2008 | Liu | G01N 29/041 702/181 |
| 2009/0016555 A1* | 1/2009 | Lynnworth | G01F 1/662 381/338 |
| 2009/0049916 A1* | 2/2009 | Sargent | G01N 29/07 73/588 |
| 2009/0165561 A1* | 7/2009 | Yabushita | G01N 29/223 73/597 |
| 2009/0301198 A1* | 12/2009 | Sohn | G01N 29/348 73/598 |
| 2011/0029287 A1* | 2/2011 | Sohn | G01R 31/2829 702/189 |
| 2011/0041612 A1* | 2/2011 | Paige | G01N 29/2412 73/623 |
| 2014/0172399 A1* | 6/2014 | Ume | G01N 29/041 703/13 |
| 2014/0208852 A1* | 7/2014 | Instanes | G01B 17/02 73/594 |
| 2014/0330528 A1* | 11/2014 | Soejima | G01N 29/46 702/39 |
| 2016/0209539 A1* | 7/2016 | Le Calvez | E21B 47/005 |
| 2017/0074832 A1* | 3/2017 | Pahlavan | G01N 29/14 |
| 2017/0234837 A1* | 8/2017 | Hall | G01N 29/2431 73/602 |
| 2018/0031525 A1* | 2/2018 | Philtron | G01N 29/069 |
| 2019/0196041 A1* | 6/2019 | Yao | G01N 29/348 |
| 2019/0353623 A1* | 11/2019 | Fournel | G01N 29/4472 |
| 2020/0141910 A1* | 5/2020 | Kessler | G01L 5/246 |

FOREIGN PATENT DOCUMENTS

| | | |
|---|---|---|
| JP | 62-84752 U | 5/1987 |
| JP | 3-67164 A | 3/1991 |
| JP | 7-191000 A | 7/1995 |
| JP | 2001-13118 A | 1/2001 |
| JP | 2003-57213 A | 2/2003 |
| JP | 2007-17298 A | 1/2007 |
| JP | 2008-164394 A | 7/2008 |
| JP | 2011-117878 A | 6/2011 |
| JP | 2012-37307 A | 2/2012 |
| WO | WO 2014/030615 A1 | 2/2014 |

OTHER PUBLICATIONS

International Search Report for PCT/JP2017/003394 (PCT/ISA/210) dated Apr. 25, 2017.
Japanese Office Action issued in JP Application No. 2016-545949 dated Oct. 11, 2016.
Extended European Search Report issued in corresponding EP Application No. 17759517.0 dated Dec. 7, 2018.

\* cited by examiner

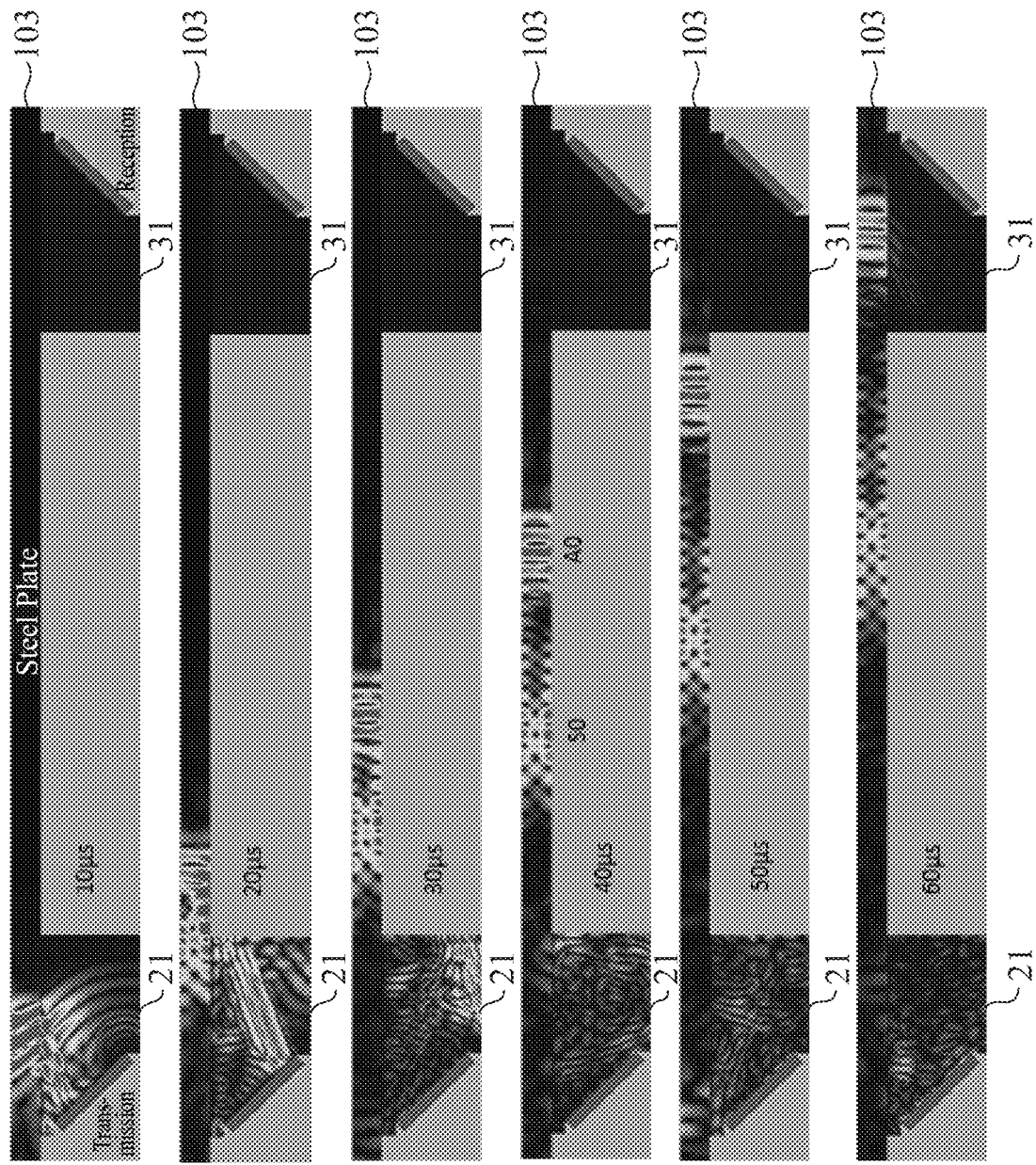

US 11,193,912 B2

ULTRASONIC MEASUREMENT APPARATUS AND ULTRASONIC MEASUREMENT METHOD

TECHNICAL FIELD

The present invention relates to an ultrasonic measurement technique for nondestructively measuring a property or state (hereinafter also referred to as a "property/state") of a test object by using ultrasonic waves, and more particularly, to an ultrasonic measurement technique for nondestructive inspection for a property/state of a test object that has a structure allowing an ultrasonic wave to propagate therethrough as plate waves of propagation modes.

BACKGROUND ART

Regarding a test object having a multilayer structure, it is difficult to visually diagnose an internal property/state between layers of the test object without destroying the test object. Conventionally, a method for diagnosing the internal property/state of such a test object has been known as the so-called impact-echo method. The impact-echo method is a method in which a person listens to an impact sound occurring when tapping a test object for example with a hammer, thereby estimating the internal property/state of the test object. However, because the impact-echo method depends on the person's audibility and recognition ability, limitations exist to its estimation accuracy. To address this issue, in some cases, an ultrasonic wave called a plate wave which propagates along a longitudinal direction of a test object having a multilayer structure has been used for nondestructive inspection for the internal property/state of the test object. In nondestructive testing, a Lamb wave, which is one type of the plate wave, is used in many cases.

For example, Patent Literature 1 (International Application Publication No. WO 2014/030615) discloses an interface-inspection method of inspecting the state of an interface of a composite structure using a Lamb wave propagating through the composite structure. In this interface-inspection method, an amplitude in a frequency band is obtained by performing a frequency analysis such as an FFT (fast Fourier transform) or signal processing using a band pass filter, on the received signal waveform obtained from a Lamb wave which has propagated through the composite structure. Then, by determining whether or not the acquired amplitude is less than a threshold, the state of the interface of the composite structure is estimated.

CITATION LIST

Patent Literature

Patent Literature 1: International Application Publication No. WO 2014/030615 (for example, FIG. 3 and paragraphs [0026] to [0029])

SUMMARY OF INVENTION

Technical Problem

However, the received signal waveform obtained from the Lamb wave possibly includes a mixture of propagation modes. Therefore, with the interface-inspection method disclosed in Patent Literature 1, accurate estimation of the state of the interface in the composite structure is difficult. For example, in a Lamb wave, several types of propagation modes exist, including the so-called symmetric modes of the 0th, 1st, 2nd, . . . order modes, and the so-called anti-symmetric modes of the 0th, 1st, 2nd, . . . order modes. As described above, in the interface-inspection method disclosed in Patent Literature 1, the state of the interface is estimated by determining whether or not the acquired amplitude in the frequency band is less than the threshold. However, there is the problem that high accurate estimation is difficult because the acquired amplitude possibly includes a mixture of frequency components of propagation modes.

In view of the foregoing, it is an object of the present invention to provide an ultrasonic measurement apparatus and ultrasonic measurement method which are capable of estimating a property/state of a test object with high accuracy in consideration of different propagation modes of a plate wave.

Solution to Problem

In accordance with an aspect of the present invention, there is provided an ultrasonic measurement apparatus for estimating a property or state of a test object that has a pair of boundary faces extending in a longitudinal direction the test object and allows an ultrasonic wave injected into a region between the pair of boundary faces to propagate along the pair of boundary faces as plate waves of propagation modes. The ultrasonic measurement apparatus includes: a receiver configured to receive a detected signal obtained by detecting the plate waves to output a received signal indicating a time-domain waveform of the detected signal; an intensity detector configured to detect, from the received signal, a signal intensity of a first waveform part appearing in a first gate period prescribed on a basis of group-velocity dispersion of a first propagation mode that is one of the propagation modes, and configured to detect, from the received signal, a signal intensity of a second waveform part appearing in a second gate period prescribed on a basis of group-velocity dispersion of a second propagation mode that is another one of the propagation modes; and an estimator configured to make a comparison between the signal intensity of the first waveform part and the signal intensity of the second waveform part, and configured to estimate a property or state of the test object on a basis of a result of the comparison.

Advantageous Effects of Invention

According to the present invention, a comparison between the signal intensity of the first waveform part corresponding to the first propagation mode and the signal intensity of the second waveform part corresponding to the second propagation mode is made, and an estimation of a property/state of the test object is performed on the basis of a result of the comparison. This allows for high accurate estimation of the property/state of the test object.

BRIEF DESCRIPTION OF DRAWINGS

FIGS. 6A to 6F are diagrams showing a result of a simulation which is performed in a case in which an interlayer portion is an air layer;

DESCRIPTION OF EMBODIMENTS

Various embodiments according to the present invention will be described in detail below with reference to the drawings.

Embodiment 1

Figure 1:
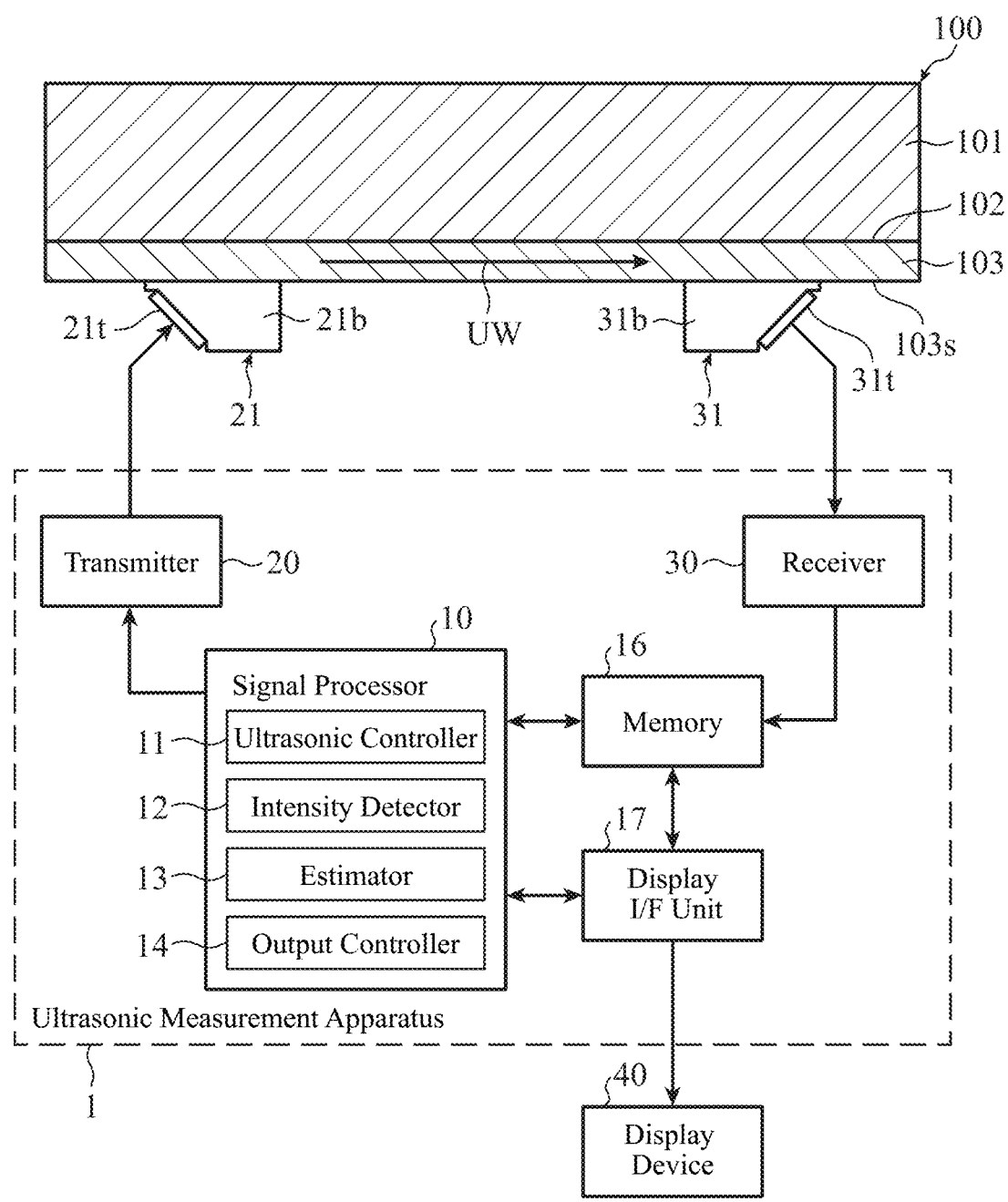
FIG. 1 is a block diagram showing a schematic configuration of an ultrasonic measurement system that is Embodiment 1 according to the present invention.

FIG. 1 is a block diagram showing the schematic configuration of an ultrasonic measurement system that is Embodiment 1 according to the present invention. This ultrasonic measurement system is configured to include a pair of probes 21 and 31 which are arranged to face each other on a surface of a test object 100 having a multilayer structure, inject a transmission ultrasonic wave into the test object 100 from the transducer probe 21 that is one of the pair of probes 21 and 31 thereby to generate plate waves UW of propagation modes in the test object 100, and estimate a property/state of the test object 100 on the basis of a time-domain waveform of a detected signal obtained by detecting the plate waves UW by using the receiver probe 31 that is the other one of the pair of probes 21 and 31. A schematic diagram of a cross section of the test object 100 is shown in FIG. 1.

As shown in FIG. 1, the ultrasonic measurement system includes: the transducer probe 21 that injects an ultrasonic wave into the test object 100; the receiver probe 31 that detects plate waves UW of propagation modes (multiple modes) propagating through the inside of the test object 100, and outputs a detected signal; an ultrasonic measurement apparatus 1 that estimates a property/state of the test object 100 on the basis of a time-domain waveform of the detected signal; and a display device 40. The display device 40 can consist of a display device such as a liquid crystal display or an organic electroluminescence display.

The test object 100 used in the present embodiment is a multilayer structure in which a first member 101 consisting of an upper solid layer extending in a longitudinal direction of the test object 100, and a second member 103 consisting of a lower solid layer extending in the longitudinal direction are laminated. An interlayer portion 102 between the first member 101 and the second member 103 forms an interface between the first member 101 and the second member 103. Further, the interlayer portion 102 forms an acoustical boundary face that reflects an ultrasonic wave. A lower surface of the second member 103 also forms an acoustical boundary face that reflects an ultrasonic wave. Therefore, an ultrasonic wave injected into the second member 103 propagates along the boundary faces and along the longitudinal direction of the test object 100. Further, the wavelength of the ultrasonic wave is adjusted to be substantially the same as or a fraction of the thickness of the second member 103 (in other words, the thickness of the second member 103 is substantially the same as or several times the wavelength of the ultrasonic wave). Therefore, the ultrasonic wave injected into the second member 103 propagates as plate waves UW of multiple modes. In the present embodiment, it is assumed that Lamb waves are generated as the plate waves UW.

The structure of the test object 100 shown in FIG. 1 is an example, and is not limited to the example. For example, in the present embodiment, although the test object 100 having a two-layer structure is used, a test object having a three-layer structure can be used instead. Further, a coating film can be formed on the surface 103s of the second member 103.

The transducer probe 21 and the receiver probe 31 are angle-beam probes which are disposed on the surface 103s of the second member 103. The transducer probe 21 has a vibrator 21t that generates an ultrasonic wave in accordance with an excitation signal supplied from the ultrasonic measurement apparatus 1, and a wedge 21b that allows the ultrasonic wave to enter the second member 103 from a direction oblique to the surface 103s of the second member 103. The ultrasonic wave enters the second member 103 via a coupling medium (not illustrated) such as water, oil, or glycerin. Here, the coupling medium is viscous material that allows an ultrasonic wave to efficiently permeate the second member 103 from the wedge 21b. On the other hand, the receiver probe 31 has a wedge 31b that receives the plate waves UW propagating through the inside of the second member 103 via a coupling medium (not illustrated) such as water, oil, or glycerin, and a vibrator 31t for reception that converts the plate waves UW into an electrical detected signal. The detected signal is supplied to the ultrasonic measurement apparatus 1. Each of the vibrators 21t and 31t can be constituted using well-known piezoelectric vibrators.

It is known that many propagation modes with velocity dispersion characteristics exist with respect to a plate wave. Specifically, there can be a propagation mode which is called a symmetric mode for which a propagation medium is displaced symmetrically in a direction of its thickness, and a propagation mode which is called an anti-symmetric mode for which a propagation medium is displaced anti-symmetrically in a direction of its thickness. In addition, as symmetric modes, there can exist an S0 mode which is a 0th-order symmetric mode (fundamental symmetric mode), an S1 mode which is a 1st-order symmetric mode, and 2nd and higher order symmetric modes, including an S2 mode which is a 2nd-order symmetric mode, and . . . . As anti-symmetric modes, there can exist an A0 mode which is a 0th-order anti-symmetric mode (fundamental anti-symmetric mode), an A1 mode which is a 1st-order anti-symmetric mode, and 2nd and higher order anti-symmetric modes, including an A2 mode which is a 2nd-order anti-symmetric mode, and . . . . For example, a propagation medium where the S0 mode occurs is displaced to symmetrically expand in a direction perpendicular to the propagation direction of the plate wave, or to symmetrically shrink in the perpendicular direction.

Figure 2:
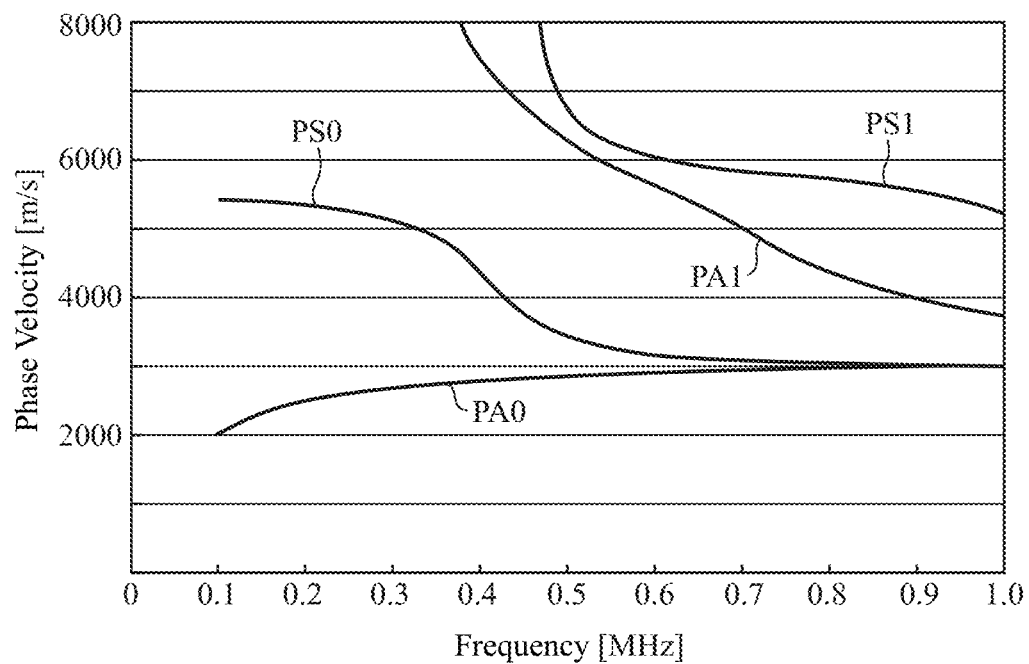
FIG. 2 is a graph showing an example of the dispersion characteristics of the phase velocities of plate waves.
Figure 3:
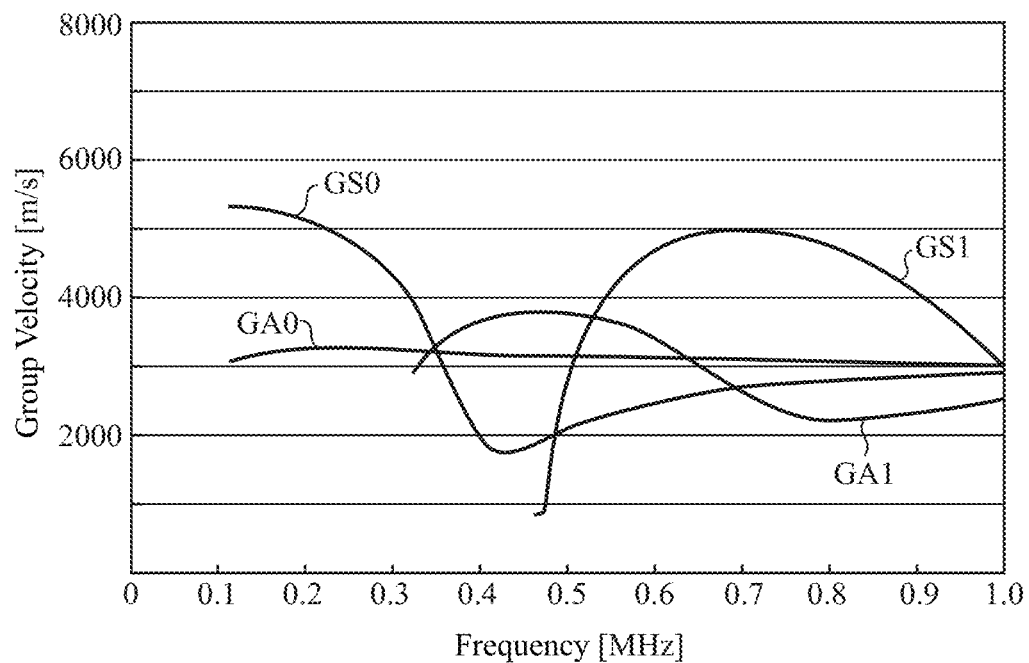
FIG. 3 is a graph showing an example of the dispersion characteristics of the group velocities of plate waves.

Further, the velocity dispersion characteristics of a plate wave mean that the velocities (phase velocity and group velocity) of the plate wave depend on the product of the thickness of the propagation medium and the frequency of the plate wave. FIGS. 2 and 3 are graphs showing an example of, in a case in which a steel plate having a thickness of 6 mm is used as the second member 103, the velocity dispersion characteristics of plate waves propagating through the inside of the steel plate. FIG. 2 is a graph showing the phase velocity dispersion characteristics of the plate waves. In the graph shown in FIG. 2, the horizontal axis shows the frequency (unit: MHz), and the vertical axis shows the phase velocity (unit: m/s). On the other hand, FIG. 3 is a graph showing the group-velocity dispersion characteristics of the plate waves. In the graph shown in FIG. 3, the horizontal axis shows the frequency (unit: MHz), and the vertical axis shows the group velocity (unit: m/s). In the graphs of FIGS. 2 and 3, reference signs PS0 and GS0 denote dispersion curves of the S0 mode, reference signs PS1 and GS1 denote dispersion curves of the S1 mode, reference signs PA0 and GA0 denote dispersion curves of the A0 mode, and reference signs PA1 and GA1 denote dispersion curves of the A1 mode. It is seen from the graph shown in FIG. 2 that when the frequency is of the order of 0.4 MHz, a plate wave of the A0 mode and a plate wave of the S0 mode can be excited. Further, it is seen from the graph shown in FIG. 3 that when the frequency is of the order of 0.4 MHz, the plate wave of the A0 mode propagates faster than the plate wave of the S0 mode.

Next, a simulation which is performed using a computer in order to examine the details of the characteristics of the above-mentioned propagation modes will be explained.

Figure 4:
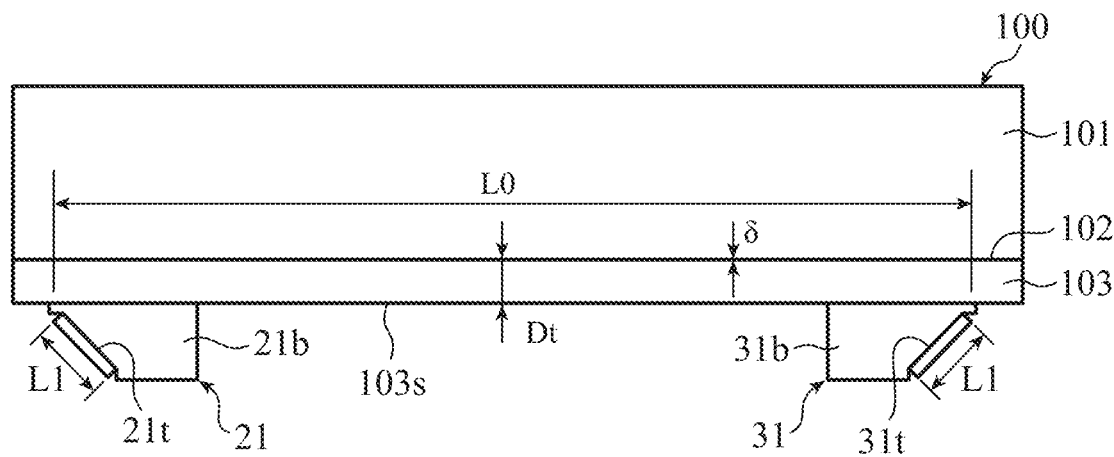
FIG. 4 is an explanatory diagram of the configurations of a test object, transducer probe, and receiver probe for use in a simulation.

First, conditions imposed on the simulation will be explained with reference to FIGS. 4, 5A, and 5B. FIG. 4 is an explanatory diagram of the configurations of the test object 100, transducer probe 21, and receiver probe 31 for use in the simulation. In the simulation, a steel plate having a thickness of Dt=6 mm is selected as the second member 103 that causes the plate waves UW to propagate therethrough. As material constants of the first member 101, a longitudinal wave sound velocity of 4, 200 m/s, a transverse wave sound velocity of 2,000 m/s, and a density of 2,300 kg/m$^3$ are selected. The interlayer portion 102 has a thickness δ of 0.2 mm.

Further, the spacing L0 between the transducer probe 21 and the receiver probe 31 is the distance between a left end of the vibrator 21t for transmission, and a right end of the vibrator 31t for reception, as shown in FIG. 4. The spacing L0 is set to 200 mm. The vibrators 21t and 31t are arranged to be symmetrical geometrically. The size L1 of the vibrator 21t is 20 mm, and the size L1 of the vibrator 31t is also 20 mm. The vibrator 21t emits an ultrasonic wave which is a longitudinal wave. The incident angle of the longitudinal wave onto the surface 103s of the second member 103 (the angle between the direction normal to the surface 103s and the propagation direction of the longitudinal wave) is 46 degrees. Further, the sound velocity at each of the wedges 21b and 31b is 2,360 m/s.

Figure 5A:
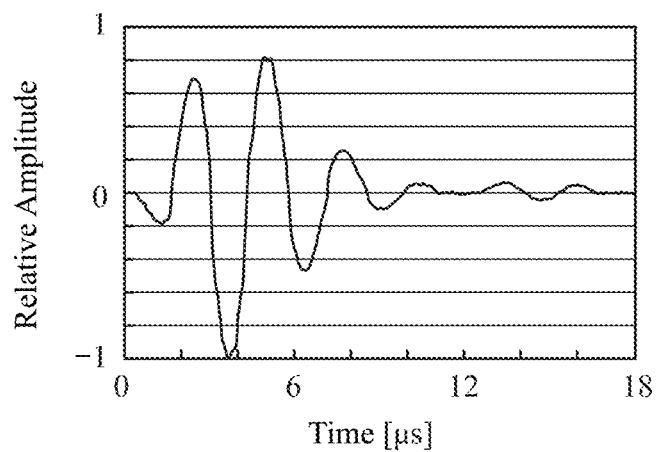
FIGS. 5A and 5B are graphs showing the response characteristics of the probes used in the simulation in Embodiment 1.
Figure 5B:
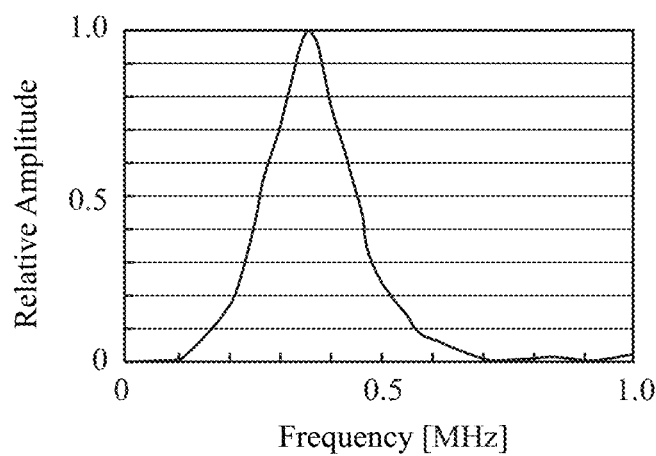

FIGS. 5A and 5B are graphs showing response characteristics common to the transducer probe 21 and the receiver probe 31 which are used in the simulation. FIG. 5A is a graph showing a time domain response characteristic. In the graph, the horizontal axis shows a time (unit: microseconds), and the vertical axis shows relative amplitude in a linear scale. Further, FIG. 5B is a graph showing a frequency domain response characteristic. In the graph, the horizontal axis shows the frequency (unit: MHz) of the ultrasonic wave, and the vertical axis shows the relative amplitude in a linear scale. As shown in FIG. 5B, the center frequency of the ultrasonic wave used in the simulation is approximately 0.4 MHz.

FIGS. 6A to 6F are diagrams showing results of a simulation which is performed under the above-mentioned conditions in a case in which the interlayer portion 102 is an air layer. In this case, the second member 103 is acoustically separated completely from the first member 101. FIG. 6A shows a simulation result of a sound field when 10 microseconds have elapsed since the start of emission of an ultrasonic wave, FIG. 6B shows a simulation result of the sound field when 20 microseconds have elapsed, FIG. 6C shows a simulation result of the sound field when 30 microseconds have elapsed, FIG. 6D shows a simulation result of the sound field when 40 microseconds have elapsed, FIG. 6E shows a simulation result of the sound field when 50 microseconds have elapsed, and FIG. 6F shows a simulation result of the sound field when 60 microseconds have elapsed. In FIGS. 6A to 6F, the amplitude of the ultrasonic wave is displayed in shades of gray. Referring to FIG. 6D, the sound field denoted by a reference sign S0 shows a plate wave of the S0 mode, and the sound field denoted by a reference sign A0 shows a plate wave of the A0 mode. In FIGS. 6A to 6F, an illustration of the first member 101 is omitted because the ultrasonic wave does not propagate through the first member 101.

As shown in FIGS. 6A to 6F, it is seen that there occurs a situation in which the plate wave of the S0 mode and the plate wave of the A0 mode propagate with the passage of time. According to the dispersion curves GS0 and GA0 of the group velocities shown in FIG. 3, the plate wave having a frequency of 0.4 MHz of the A0 mode propagates faster than the plate wave having a frequency of 0.4 MHz of the S0 mode. Therefore, it is presumed that the receiver probe 31 receives the plate wave of the S0 mode after receiving the plate wave of the A0 mode.

Figures 7A, 7B:
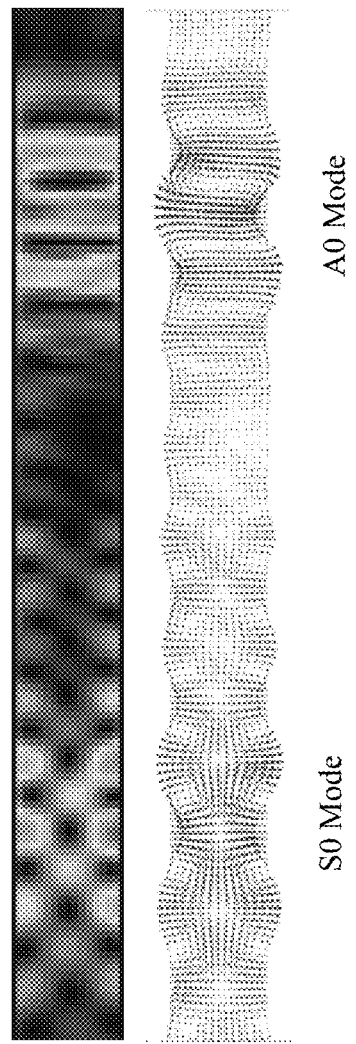
FIG. 7A illustrates an enlarged diagram of sound fields of S0 and A0 modes which are shown in FIG. 6D.
FIG. 7B is a diagram showing a displacement distribution caused by the sound fields of the S0 and A0 modes.

FIG. 7A illustrates an enlarged diagram of the sound fields of the S0 mode and A0 mode which are shown in FIG. 6D. Further, FIG. 7B illustrates a diagram of a displacement distribution of the steel plate (second member 103) which is caused by the sound fields of the S0 mode and A0 mode. As shown in FIG. 7B, a part of the propagation medium in the steel plate in which the S0 mode occurs is displaced to symmetrically expand in a direction (vertical direction in the drawing) perpendicular to the propagation direction of the plate wave, or to symmetrically shrink in the perpendicular direction. In contrast, it is seen from the figure that a part of the propagation medium in the steel plate in which the A0 mode occurs is anti-symmetrically displaced in the perpendicular direction (vertical direction in the drawing).

Figure 8:
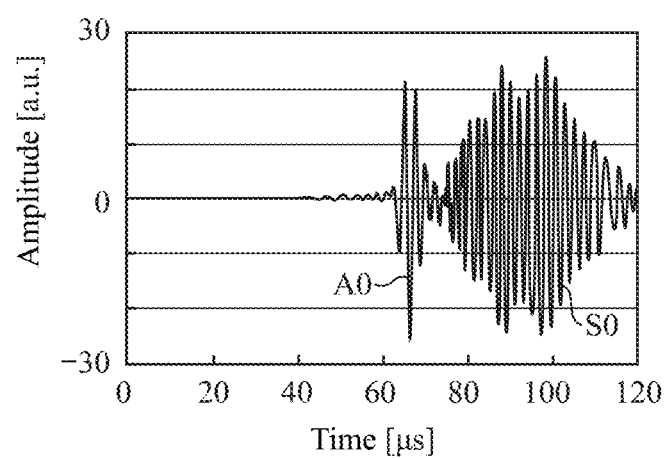
FIG. 8 is a graph showing an example of a time-domain waveform obtained by detecting plate waves of the S0 and A0 modes.

FIG. 8 is a graph showing a time-domain waveform which is obtained by detecting both the plate waves of the S0 mode and A0 mode as described above. In the graph shown in FIG. 8, the horizontal axis shows an elapsed time (unit: microseconds), and the vertical axis shows amplitude (unit: arbitrary units). Further, a waveform part denoted by a reference sign A0 shows a result of the detection of the plate wave of the A0 mode, and a waveform part denoted by a reference sign S0 shows a result of the detection of the plate wave of the S0 mode. According to the graph, the peak-to-peak amplitude of the waveform part of the A0 mode is nearly the same as that of the waveform part of the S0 mode. The peak-to-peak amplitude is the absolute value of the difference between the positive peak value (maximum of positive amplitude values), and the negative peak value (minimum of negative amplitude values). For example, when the positive peak value is +21 and the negative peak value is −25, the peak-to-peak amplitude is 46 (=|+21−(−25)|).

Figures 9A, 9B, 9C:
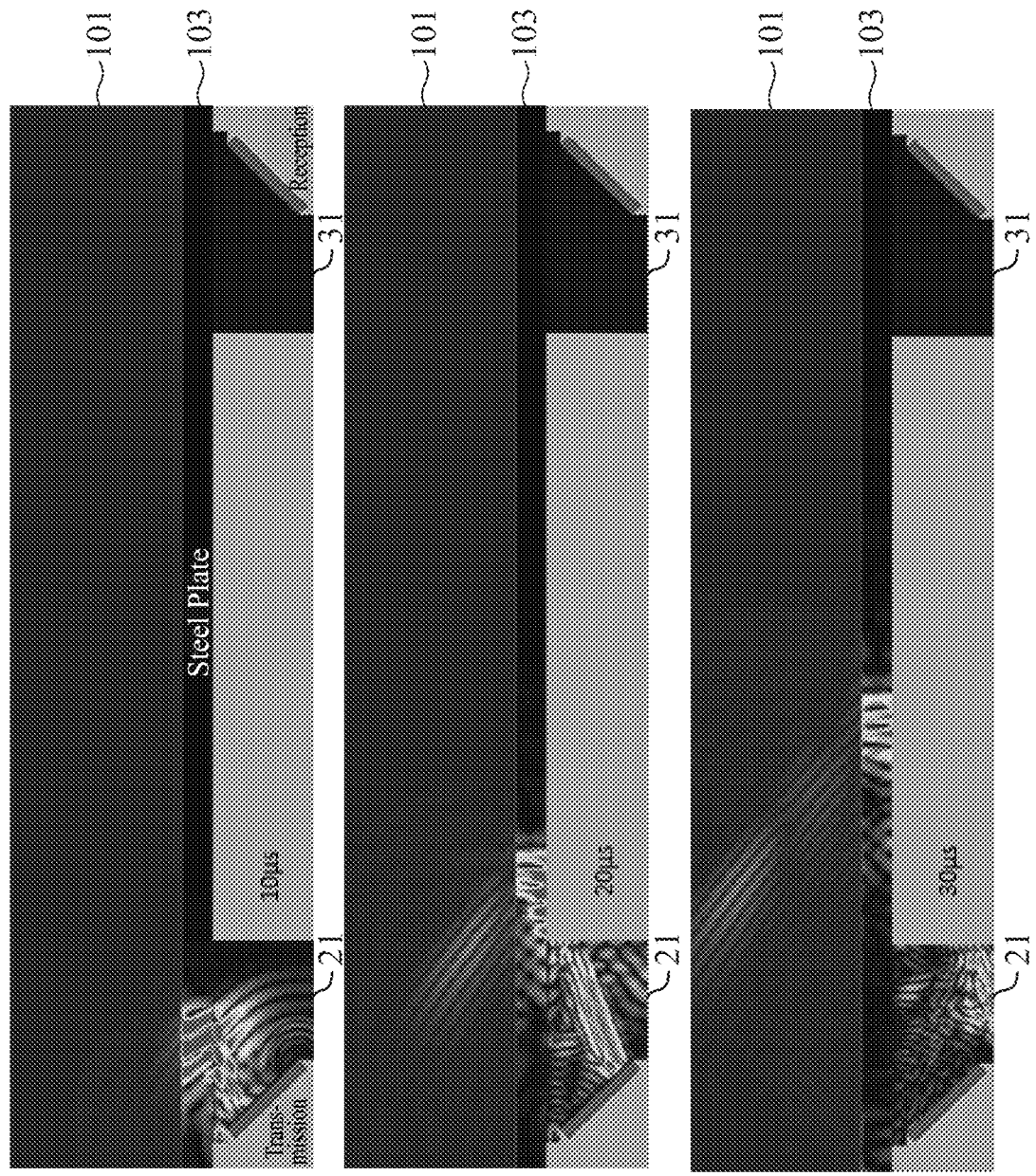
FIGS. 9A to 9C are diagrams showing a result of a simulation which is performed in a case in which the interlayer portion is immersed in water.
Figure 10A:
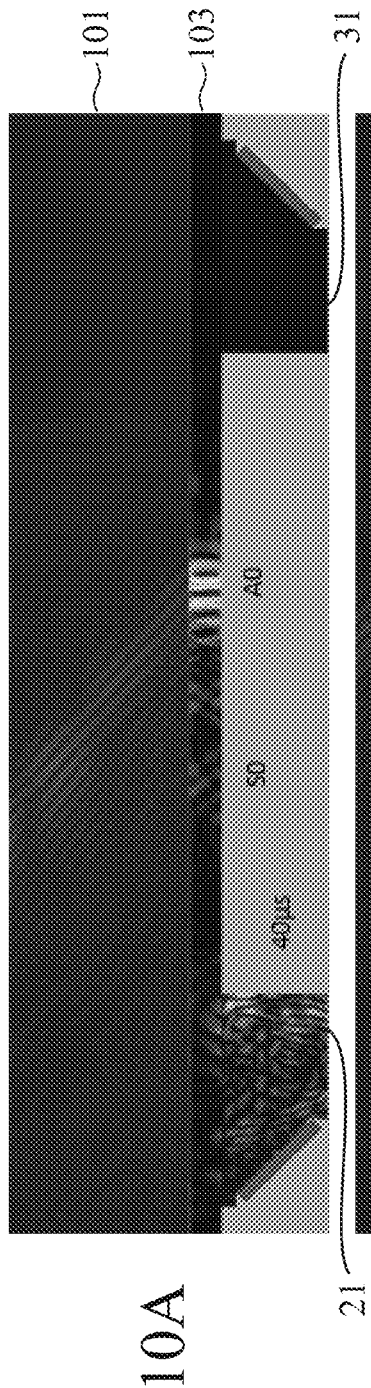
FIGS. 10A to 10C are diagrams showing a result of a simulation which is performed in the case in which the interlayer portion is immersed in water.
Figure 10B:
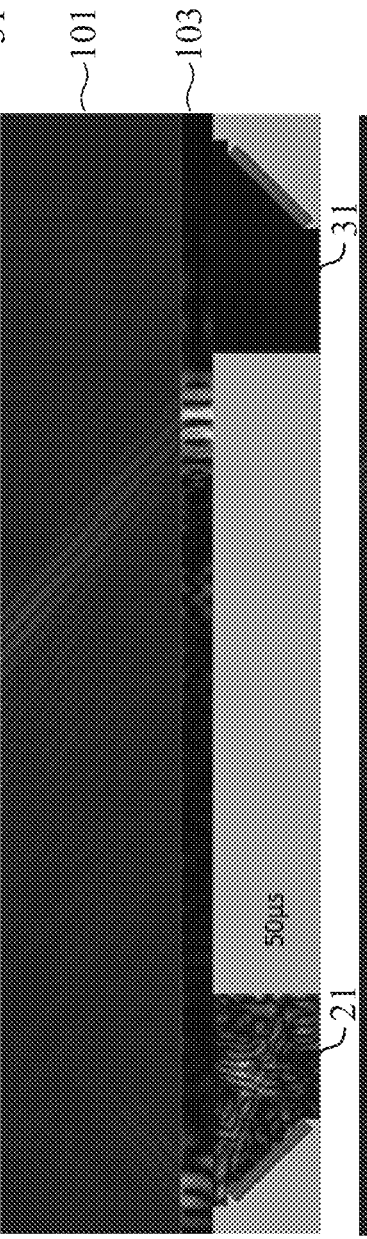
Figure 10C:
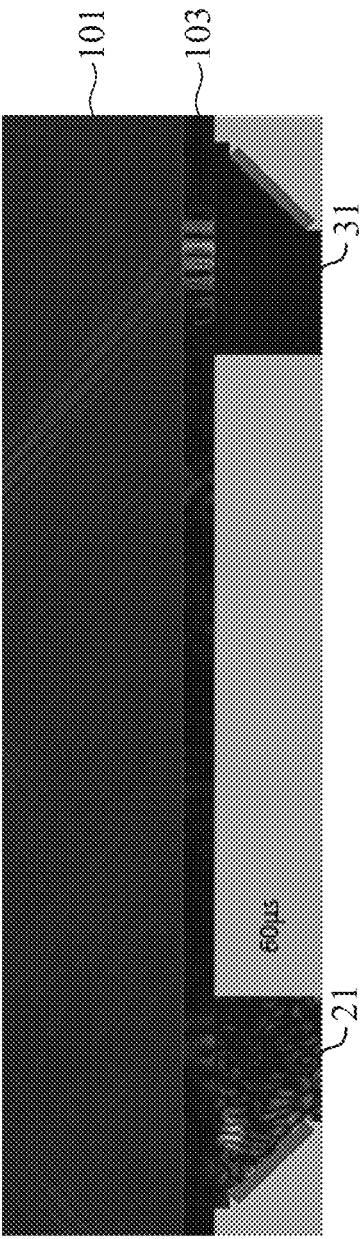

The above-mentioned simulation results are the ones which are acquired in the case in which the interlayer portion 102 is an air layer, more specifically, in the case in which the second member 103 is acoustically separated completely from the first member 101. Next, a simulation which is performed under the above-mentioned conditions in a case in which the interlayer portion 102 is immersed in water will be explained. FIGS. 9A to 9C and 10A to 10C are diagrams showing results of the simulation which is performed under the above-mentioned conditions in the case in which the interlayer portion 102 is immersed in water. FIG. 9A shows a simulation result of a sound field when 10 microseconds have elapsed since the start of emission of an ultrasonic wave, FIG. 9B shows a simulation result of the sound field when 20 microseconds have elapsed, FIG. 9C shows a simulation result of the sound field when 30 microseconds have elapsed, FIG. 10A shows a simulation result of the sound field when 40 microseconds have elapsed, FIG. 10B shows a simulation result of the sound field when 50 microseconds have elapsed, and FIG. 10C shows a simulation result of the sound field when 60 microseconds have elapsed. In FIGS. 9A to 9C and 10A to 10C, the amplitude of the ultrasonic wave is displayed in shades of gray. Referring to FIG. 10A, the sound field denoted by a reference sign S0 shows a plate wave of the S0 mode, and the sound field denoted by a reference sign A0 shows a plate wave of the A0 mode.

As shown in FIGS. 9A to 9C and 10A to 10C, the plate wave of the S0 mode and the plate wave of the A0 mode propagate with the passage of time. It is seen that because water is invaded into the interlayer portion 102, there occurs a situation in which the sound energy of the ultrasonic wave is leaked from the second member 103, via the interlayer portion 102, to the first member 101. It is to be noted that the state of the sound energy leakage differs between the A0 mode and the S0 mode. More specifically, because the amount of leakage of the sound energy of the S0 mode is larger than the amount of leakage of the sound energy of the A0 mode, the plate wave of the S0 mode attenuates rapidly with the passage of time. In contrast, the amount of leakage of the sound energy of the A0 mode is relatively small. Therefore, in comparison with the S0 mode, the amplitude of the A0 mode does not become so small while the plate wave of the A0 mode propagates from the transducer probe 21 to the receiver probe 31.

Figures 11A, 11B:
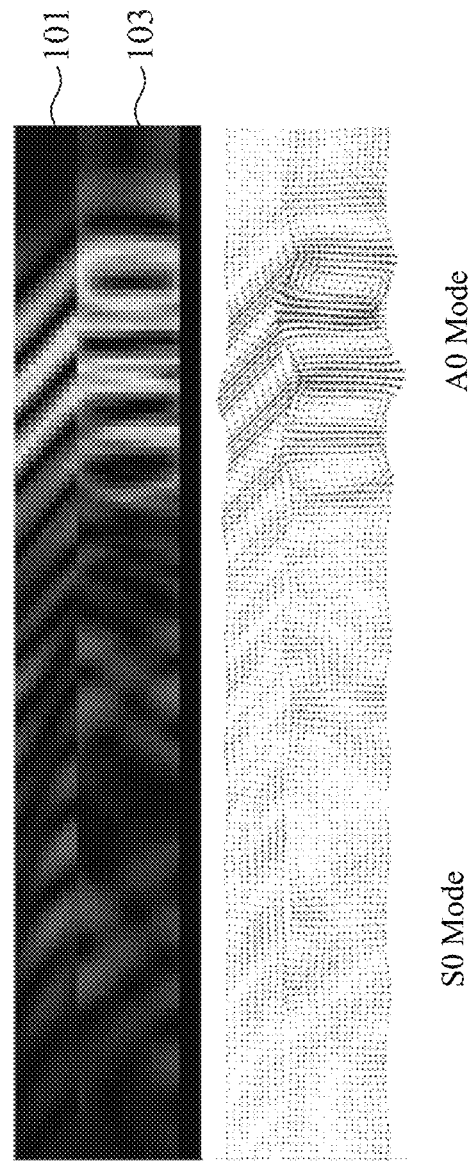
FIG. 11A illustrates an enlarged diagram of sound fields of the S0 and A0 modes which are shown in FIG. 10A, and FIG. so 11B illustrates a diagram of a displacement distribution caused by the sound fields of the S0 and A0 modes.

FIG. 11A illustrates an enlarged diagram of the sound fields of the S0 mode and A0 mode which are shown in FIG. 10A. Further, FIG. 11B is a diagram showing displacement distributions of the first member 101 and second member 103 which are caused by the sound fields of the S0 mode and A0 mode. It is seen from FIGS. 11A and 11B that the amplitude of the S0 mode is very small compared with the amplitude of the A0 mode.

Figure 12:
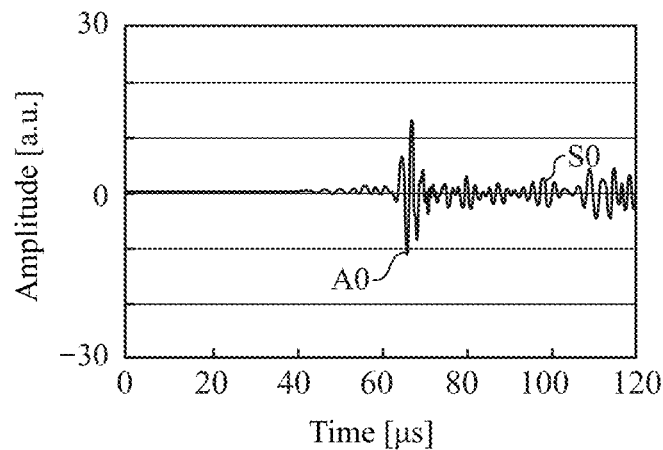
FIG. 12 is a graph showing an example of a time-domain waveform obtained by detecting plate waves of the A0 and S0 modes which are shown in FIGS. 11A and 11B.

FIG. 12 is a graph showing a time-domain waveform which is obtained by detecting both the plate wave of the S0 mode and the plate wave of the A0 mode which are shown in FIGS. 11A and 11B. In the graph shown in FIG. 12, the horizontal axis shows an elapsed time (unit: microseconds), and the vertical axis shows amplitude (unit: arbitrary units). Further, a waveform part denoted by a reference sign A0 shows a result of the detection of the plate wave of the A0 mode, and a waveform part denoted by a reference sign S0 shows a result of the detection of the plate wave of the S0 mode. According to the graph, the peak-to-peak amplitude of the waveform part of the A0 mode is clearly larger than that of the waveform part of the S0 mode. Further, the decrease amount of the peak-to-peak amplitude of the waveform part of the S0 mode is larger than the decrease amount of the peak-to-peak amplitude of the waveform part of the A0 mode in the present case, as compared with the case (FIG. 8) in which the interlayer portion 102 is an air layer.

By using the findings described above, it can be estimated that which one of an air layer and a water immersion layer is the interlayer portion 102. When simply performing qualitative estimation as to which one of an air layer or a water immersion layer is the interlayer portion, an operator can perform the estimation only by observing a signal waveform as shown in FIG. 12.

By paying attention to the above-mentioned findings, and additionally conducting a further study, the present invention has been made. Hereafter, the ultrasonic measurement apparatus 1 of Embodiment 1 according to the present invention will be described.

As shown in FIG. 1, the ultrasonic measurement apparatus 1 includes a signal processor 10 that performs various processes needed for ultrasonic measurement, a transmitter 20 that supplies an excitation signal for causing emission of an ultrasonic wave to the transducer probe 21, a receiver 30 that receives a detected signal detected by the receiver probe 31 and outputs a received signal, a memory 16 that stores the received signal, and a display interface unit (display I/F unit) 17 that causes a display device 40 to display an image. The signal processor 10 has an ultrasonic controller 11, an intensity detector 12, an estimator 13, and an output controller 14.

The ultrasonic controller 11 supplies a command signal for exciting the vibrator 21t included in the transducer probe 21 to the transmitter 20. The transmitter 20 generates an excitation signal with a high frequency using the command signal as a trigger signal, amplifies the excitation signal, and supplies the amplified excitation signal to the transducer probe 21. The vibrator 21t generates an ultrasonic wave in accordance with the amplified excitation signal. The ultrasonic wave is injected into the second member 103 from an oblique direction via the wedge 21b and the coupling medium (not illustrated). The second member 103 converts the ultrasonic wave injected into the second member, into plate waves UW of propagation modes, and allows the plate waves UW to propagate toward the receiver probe 31. The vibrator 31t of the receiver probe 31 then converts the plate waves UW which have propagated via the coupling medium (not illustrated) and the wedge 31b, into a detected signal, and supplies the detected signal to the receiver 30.

The receiver 30 receives the detected signal from the receiver probe 31, and outputs a received signal showing a time-domain waveform, i.e., a received signal waveform of the detected signal. The memory 16 stores data about the received signal.

The intensity detector 12 reads the received signal from the memory 16, and detects the signal intensity $I_1$ of a waveform part which is included in the received signal waveform indicated by the received signal and which corresponds to a first propagation mode, and also detects the signal intensity $I_2$ of a waveform part which is included in the received signal waveform and which corresponds to a second propagation mode different from the first propagation mode. As the signal intensities $I_1$ and $I_2$, values of energies or amplitudes such as peak-to-peak amplitudes can be detected.

Figure 13:
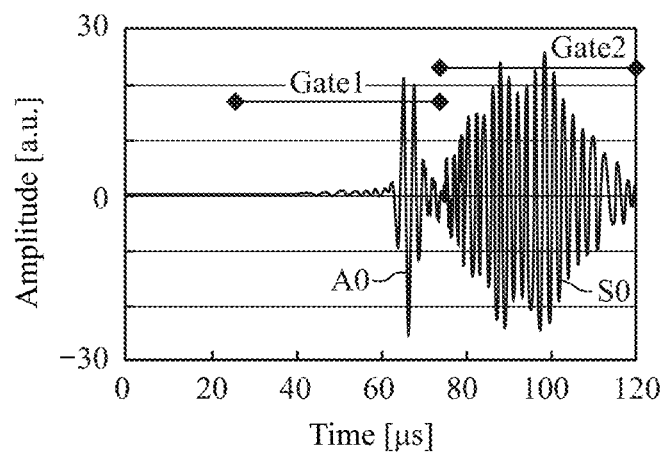
FIG. 13 is a diagram showing first and second gate periods which are set up for the received signal waveform shown in FIG. 8.
Figure 14:
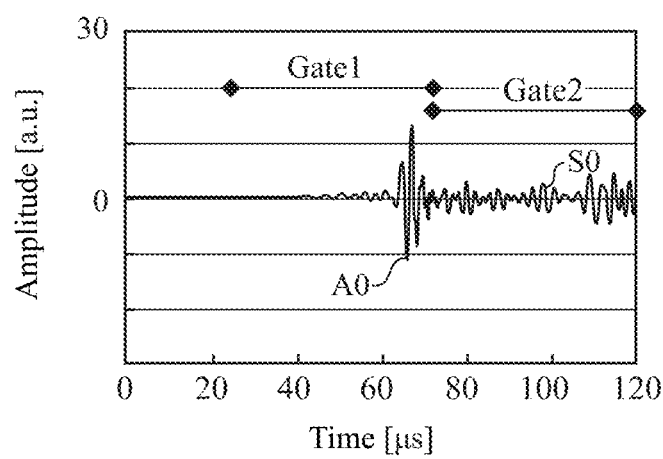
FIG. 14 is a diagram showing first and second gate periods which are set up for the received signal waveform shown in FIG. 12.

For example, in the case of the above-mentioned simulations, the plate wave of the A0 mode and the plate wave of the S0 mode are received within different time zones because of the difference in the velocity dispersion characteristics between the propagation modes, as shown in FIGS. 8 and 12. Therefore, the intensity detector 12 can sample the waveform part corresponding to the first propagation mode from the received signal in a time window (hereinafter referred to as a "first gate period") which is set up on the basis of the group-velocity dispersion characteristics of the first propagation mode, and can sample the waveform part corresponding to the second propagation mode from the received signal in a time window (hereinafter referred to as a "second gate period") which is set up on the basis of the group-velocity dispersion characteristics of the second propagation mode. FIGS. 13 and 14 are diagrams showing examples of the first gate period Gate1 and the second gate period Gate2. FIG. 13 shows the first and second gate periods Gate1 and Gate2 which are set up for the received signal waveform shown in FIG. 8, and FIG. 14 shows the first and second gate periods Gate1 and Gate2 which are set up for the received signal waveform shown in FIG. 12.

The estimator 13 shown in FIG. 1 is capable of comparing the signal intensities $I_1$ and $I_2$ detected by the intensity detector 12 with each other, and of estimating a property/state of the propagation medium through which the plate waves UW of the multiple modes propagate, on the basis of a result of the comparison. Specifically, the estimator 13 can estimate a property/state of the propagation medium on the basis of the signal intensity ratio $I_2/I_1$. The signal intensity ratio $I_2/I_1$ can be an amplitude ratio or an energy ratio.

For example, in the case of the above-mentioned simulations, as to the received signal waveform shown in FIG. 13 (the time-domain waveform of the detected signal obtained in the case in which the interlayer portion 102 is an air layer), the estimator 13 can calculate an approximate value of 1.00 as the amplitude ratio $A_2/A_1$, or calculate an approximate value of 5.10 as the energy ratio $E_2/E_1$. Here, the amplitude ratio $A_2/A_1$ is the ratio of the peak-to-peak amplitude $A_2$ of the waveform part sampled in the second gate period Gate2, to the peak-to-peak amplitude $A_1$ of the waveform part sampled in the first gate period Gate1. Further, the energy ratio $E_2/E_1$ is the ratio of the energy $E_2$ of the waveform part sampled in the second gate period Gate2, to the energy $E_1$ of the waveform part sampled in the first gate period Gate1. On the other hand, as to the received signal waveform shown in FIG. 14 (the time-domain waveform of the detected signal which is acquired in the case in which the interlayer portion 102 is immersed in water), the estimator 13 can calculate an approximate value of 0.21 as the amplitude ratio $A_2/A_1$, or calculate an approximate value of 0.56 as the energy ratio $E_2/E_1$.

Therefore, in the case of the above-mentioned simulations, the estimator 13 can calculate the following amplitude ratio $A_2/A_1$ or energy ratio $E_2/E_1$.

In the case in which the interlayer portion 102 is an air layer: $A_2/A_1=1.00$ ($E_2/E_1=5.10$)

In the case in which the interlayer portion 102 is immersed in water: $A_2/A_1=0.22$ ($E_2/E_1=0.56$)

The estimator 13 can compare the value of either the amplitude ratio $A_2/A_1$ or the energy ratio $E_2/E_1$ with one or more preset thresholds, and can estimate a property/state of the interlayer portion 102. For example, when a threshold for amplitude ratio comparison is set to 0.5, the estimator 13 can estimate that the interlayer portion 102 is an air layer when the amplitude ratio $A_2/A_1$ is equal to or greater than the threshold of 0.5, whereas the estimator can estimate that the interlayer portion 102 is immersed in water when the amplitude ratio $A_2/A_1$ is less than the threshold of 0.5. As an alternative, for example, when a threshold for energy ratio comparison is set to 1.0, the estimator 13 can estimate that the interlayer portion 102 is an air layer when the energy ratio $E_2/E_1$ is equal to or greater than the threshold of 1.0, whereas the estimator can estimate that the interlayer portion 102 is immersed in water when the energy ratio $E_2/E_1$ is less than the threshold of 1.0.

In the case where one threshold is used as described above, two types of properties/states can be distinctly estimated, including a property/state concerning the interlayer portion 102 that is an air layer, and a property/state concerning the interlayer portion 102 that is immersed in water, although no limitation thereto is intended. In a case where two or more thresholds are used, three or more types of properties/states can be distinctly estimated.

Next, an experiment which was carried out in order to verify the validity of the findings acquired in the above-mentioned simulations will be explained. In this experiment, a steel plate having a thickness of Dt=6 mm was used as the second member 103. Further, mortar was used as the first member 101. In addition, an air gap (air layer) having a thickness of 0.2 mm was disposed between the first member 101 and the second member 103 by using a spacer. The air gap constitutes the interlayer portion 102. As the transducer probe 21 and the receiver probe 31, a prototype of two angle-beam probes capable of generating a longitudinal wave sound velocity of 2, 360 m/s and an angle of incidence of 46 degrees were produced. The response characteristics of these angle-beam probes were nearly the same as the response characteristics shown in FIGS. 5A and 5B. Other experimental conditions were the same as those imposed on the above-mentioned simulations.

Figure 15:
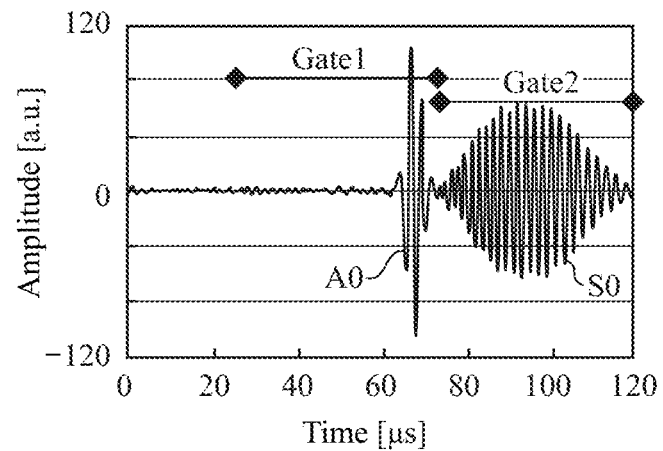
FIG. 15 is a graph showing a time-domain waveform of a detected signal in the case in which the interlayer portion is an air layer.
Figure 16:
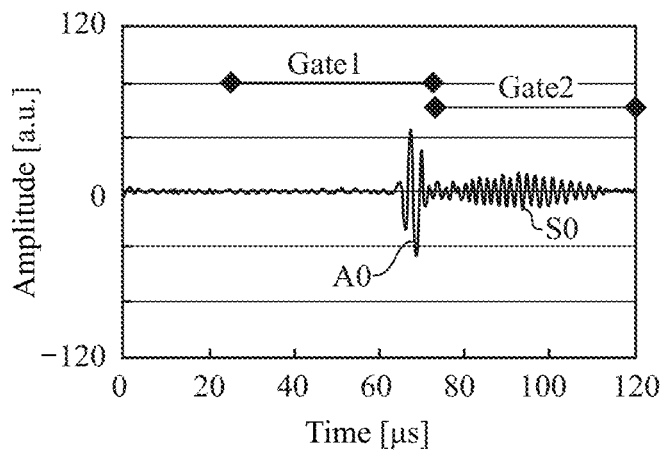
FIG. 16 is a graph showing the time-domain waveform of the detected signal in the case in which the interlayer portion is immersed in water.

FIGS. 15 and 16 are graphs each showing a time-domain waveform which is obtained by detecting both the plate wave of the S0 mode and the plate wave of the A0 mode in this experiment. FIG. 15 is a graph showing a time-domain waveform in the case in which the interlayer portion 102 is an air layer, and FIG. 16 is a graph showing a time-domain waveform in the case in which the interlayer portion 102 is immersed in water. In the graphs shown in FIGS. 15 and 16, the horizontal axis shows an elapsed time (unit: microseconds), and the vertical axis shows amplitude (unit: arbitrary units). Further, a waveform part denoted by a reference sign A0 shows a result of the detection of the plate wave of the A0 mode, and a waveform part denoted by a reference sign S0 shows a result of the detection of the plate wave of the S0 mode.

Referring to FIGS. 15 and 16, the signal of the A0 mode and the signal of the S0 mode were received, like in the case of the above-mentioned simulation results (FIGS. 13 and 14). Referring to FIG. 15, the amplitude of the waveform part of the A0 mode is relatively large compared with that in the simulation result shown in FIG. 13. It is considered that this is because the longitudinal wave sound velocity in the wedge 21b was slightly shifted from the designed value (2, 360 m/s). In this experiment, the following amplitude ratio $A_2/A_1$ and energy ratio $E_2/E_1$ were calculated.

In the case in which the interlayer portion 102 is an air layer: $A_2/A_1=0.60$ ($E_2/E_1=2.30$)

In the case in which the interlayer portion 102 is immersed in water: $A_2/A_1=0.31$ ($E_2/E_1=0.39$)

Therefore, also in the experiment, the estimator 13 of the present embodiment can compare the value of the amplitude ratio $A_2/A_1$ or the energy ratios $E_2/E_1$ with a threshold, to estimate a property/state of the interlayer portion 102. More specifically, when a threshold for amplitude ratio comparison is set to 0.5, the estimator 13 can estimate that the interlayer portion 102 is an air layer when the amplitude ratio $A_2/A_1$ is equal to or greater than the threshold of 0.5, whereas the estimator can estimate that the interlayer portion 102 is immersed in water when the amplitude ratio $A_2/A_1$ is less than the threshold of 0.5. As an alternative, when a threshold for energy ratio comparison is set to 1.0, the estimator 13 can estimate that the interlayer portion 102 is an air layer when the energy ratio $E_2/E_1$ is equal to or greater than the threshold of 1.0, whereas the estimator can estimate that the interlayer portion 102 is immersed in water when the energy ratio $E_2/E_1$ is less than the threshold of 1.0.

The output controller 14 shown in FIG. 1 can control the display I/F unit 17 to cause the display device 40 to display the estimation result obtained by the estimator 13. More specifically, when receiving data showing the estimation result from the output controller 14, the display I/F unit 17 can generate an image (e.g., a message image) showing the estimation result, and cause the display device 40 to display the image. As a result, the operator is enabled to recognize the estimation result. Further, the output controller 14 can control the display I/F unit 17 to cause the display device 40 to display the received signal waveform. More specifically, the display I/F unit 17 can read the data about the received signal from the memory 16 in accordance with a command from the output controller 14, and cause the display device 40 to display the image showing the received signal waveform indicated by the received signal. Here, the display I/F unit 17 can cause the display device 40 to display either an AC waveform as shown in FIG. 15 or 16, or to display a DC waveform in which the negative parts of the AC waveform are folded back across 0 volts.

In the above-mentioned simulations and the above-mentioned experiment, the signal intensity ratio $I_2/I_1$ (the amplitude ratio $A_2/A_1$ or the energy ratio $E_2/E_1$) is calculated using a set of the A0 mode and the S0 mode, although no limitation thereto is intended. For example, the signal intensity ratio $I_2/I_1$ can be calculated using a set of the A1 mode and the S1 mode, a set of the A2 mode and the S2 mode, or a set of the A1 mode and the S0 mode.

Further, the number of propagation modes for use in the estimation is not limited to two, and a property/state of the test object 100 can be estimated using three or more propagation modes. For example, the intensity detector 12 can sample M waveform parts corresponding to M propagation modes (e.g., the A0 mode, the S0 mode, and the S1 mode) in M gate periods (M is an integer equal to or greater than three), respectively, and calculate the signal intensities $I_1, I_2, \ldots,$ and $I_M$ of these waveform parts. In this case, the estimator 13 can estimate a property/state of the propagation medium through which the plate waves UW of the multiple modes propagate, on the basis of each ratio between two of the M signal intensity $I_1, I_2, \ldots,$ and $I_M$. For example, the estimator 13 can use one of the M signal intensities $I_1, I_2, \ldots,$ and $I_M$ as a reference value, and estimate a property/state of the propagation medium on the basis of the ratios of the signal intensities $I_1, I_2 \ldots,$ and $I_M$ to the reference value.

Figure 17:
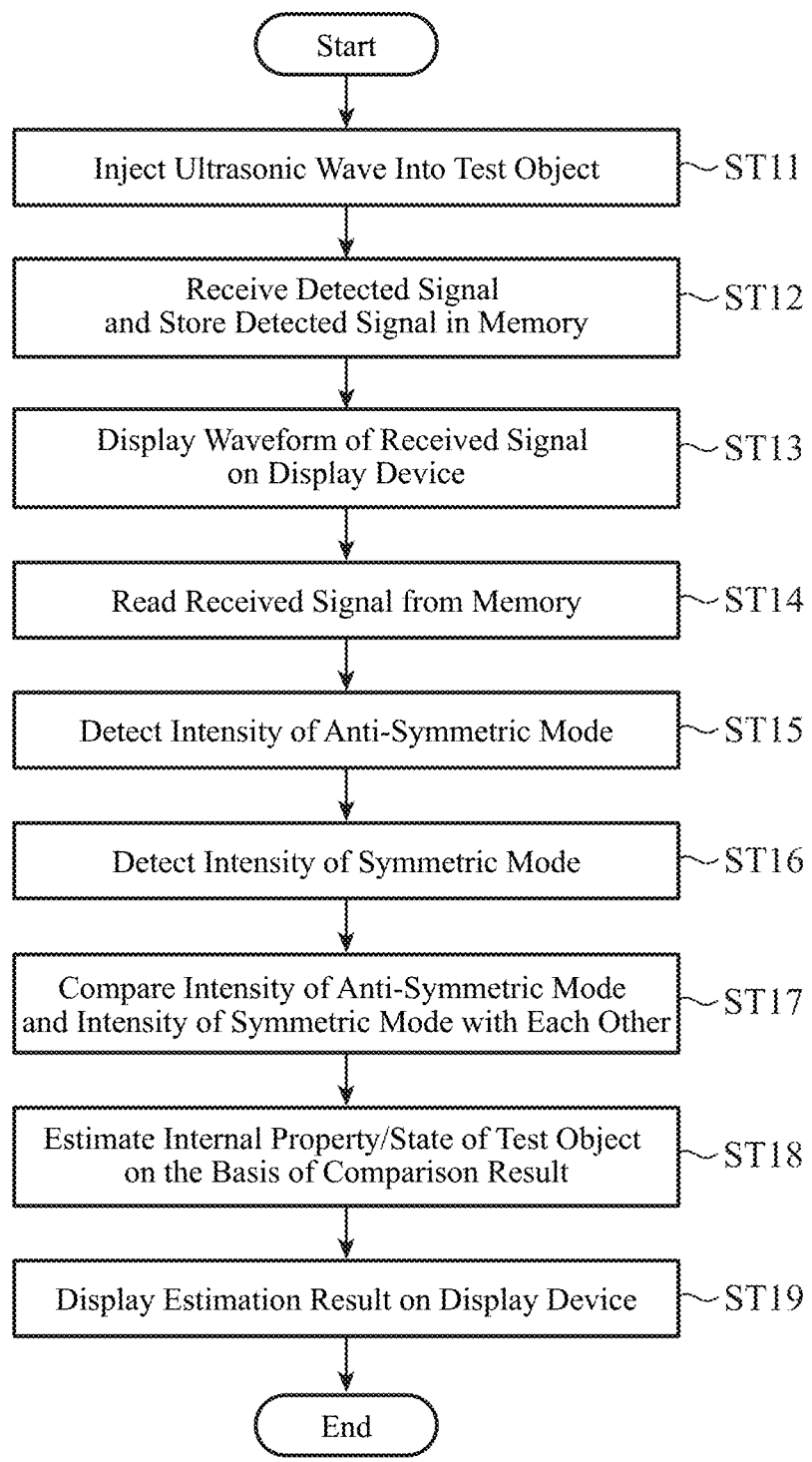
FIG. 17 is a flow chart showing an example of a procedure of ultrasonic measurement processing according to Embodiment 1.

Next, operations of the ultrasonic measurement processing according to the present embodiment will be described simply with reference to FIG. 17. FIG. 17 is a flow chart showing an example of the procedure of the ultrasonic measurement processing according to the present embodiment.

Referring to FIG. 17, the transmitter 20 supplies an excitation signal to the transducer probe 21 upon receipt of a command signal from the ultrasonic controller 11, to thereby inject an ultrasonic wave into the test object 100 (step ST11). As a result, plate waves of multiple modes UW occur inside the second member 103. The receiver 30 receives a detected signal from the receiver probe 31, and stores the detected signal in the memory 16 (step ST12). Thereafter, the output controller 14 controls the display I/F unit 17 to cause the display device 40 to display a received signal waveform indicated by the received signal (step ST13).

Next, the intensity detector 12 reads the received signal from the memory 16 (step ST14), and calculates the signal intensity of an anti-symmetric mode (e.g., the A0 mode), i.e., the signal intensity $I_1$ of a waveform part corresponding to the anti-symmetric mode, on the basis of the received signal (step ST15). Next, the intensity detector 12 calculates the signal intensity of a symmetric mode (e.g., the S0 mode), i.e., the signal intensity $I_2$ of a waveform part corresponding to the symmetric mode, on the basis of the received signal (step ST16).

Thereafter, the estimator 13 compares the signal intensity $I_1$ of the anti-symmetric mode and the signal intensity $I_2$ of the symmetric mode with each other (step ST17), and estimates a property/state of the inside of the test object 100 on the basis of a result of the comparison (step ST18). Here, as described above, the estimator 13 can estimate a property/state of the inside of the test object 100 on the basis of the ratio of the signal intensity $I_2$ of the symmetric mode to the signal intensity $I_1$ of the anti-symmetric mode. The estimator 13 can alternatively estimate a property/state of the inside of the test object 100 on the basis of the ratio of the signal intensity $I_1$ of the anti-symmetric mode to the signal intensity $I_2$ of the symmetric mode.

The output controller 14 then controls the display I/F unit 17 to cause the display device 40 to display the estimation result obtained by the estimator 13 (step ST19). At this time, an image showing the estimation result can be displayed, on the single screen of the display device 40, in parallel with an image of the received signal waveform which is displayed in step ST13, or can be displayed while being superimposed on the image of the received signal waveform. Therefore, the operator can simultaneously check both the estimation result and the received signal waveform, to recognize the property/state of the test object 100 correctly. Thereafter, the ultrasonic measurement processing is ended.

A hardware configuration of the above-mentioned ultrasonic measurement apparatus 1 can be implemented using a computer in which a CPU (Central Processing Unit) is mounted, such as a personal computer or workstation. As an alternative, a hardware configuration of the above-mentioned ultrasonic measurement apparatus 1 can be implemented using an LSI (Large Scale Integrated circuit) such as a DSP (Digital Signal Processor), an ASIC (Application Specific Integrated Circuit), or an FPGA (Field-Programmable Gate Array).

Figure 18:
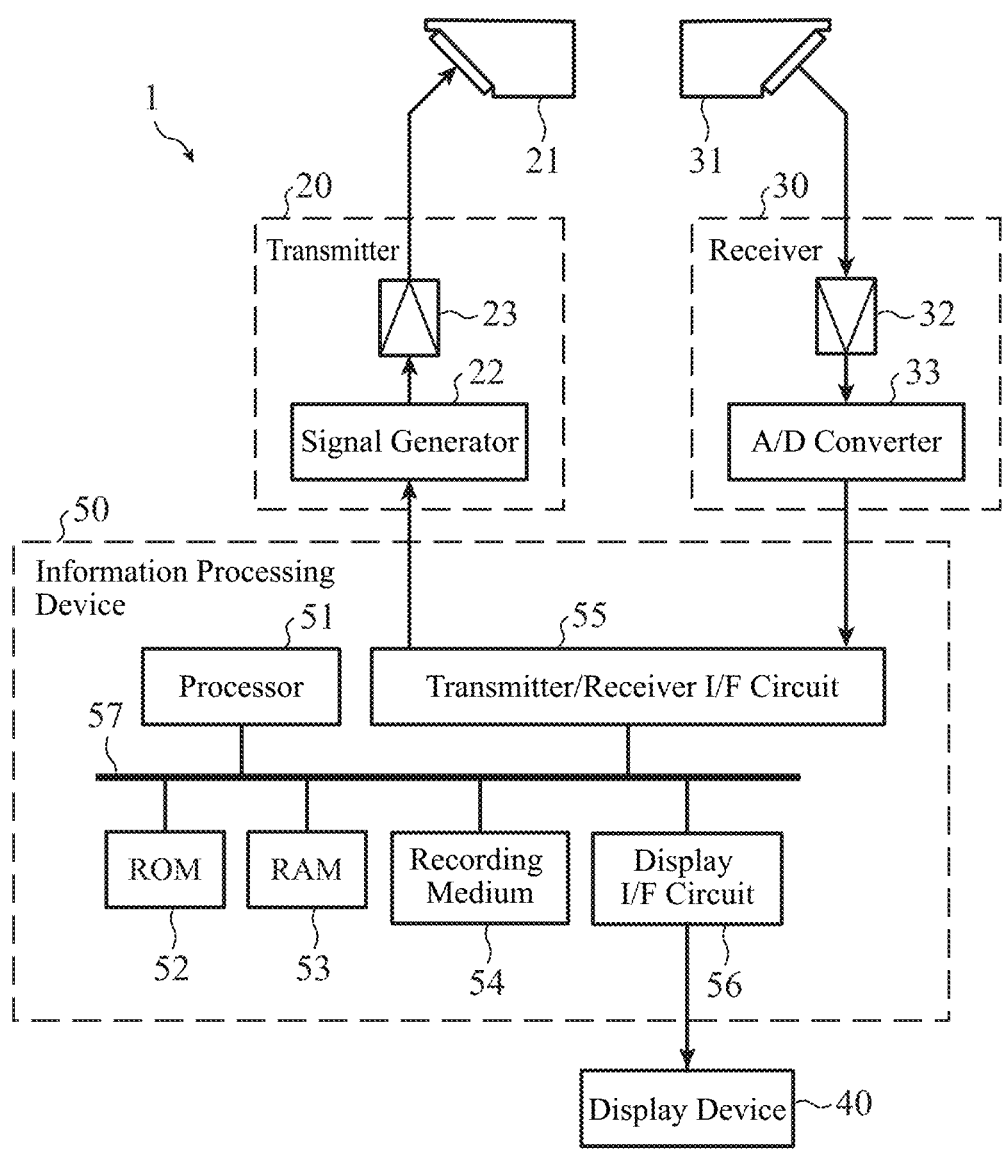
FIG. 18 is a diagram showing an example of the hardware configuration of an ultrasonic measurement apparatus according to Embodiment 1.

FIG. 18 is a block diagram schematically showing an example of the hardware configuration of the ultrasonic measurement apparatus 1. In the example shown in FIG. 18, the ultrasonic measurement apparatus 1 includes the transmitter 20, the receiver 30, and an information processing device 50. The information processing device 50 has a processor 51 including a CPU, a ROM (Read Only Memory) 52, a RAM (Random Access Memory) 53, a recording medium 54, a transmission and reception interface circuit (transmitter/receiver I/F circuit) 55, and a display interface circuit (display I/F circuit) 56. The processor 51, the ROM 52, the RAM 53, the recording medium 54, the transmitter/receiver I/F circuit 55, and the display I/F circuit 56 are connected to one another via a signal path 57 such as a bus circuit. The signal processor 10, the memory 16, and the display I/F unit 17 according to the present embodiment can be implemented by the information processing device 50.

The processor 51 can implement the function of the signal processor 10 by using the RAM 53 as a working memory and executing a computer program for ultrasonic measurement which is read from the ROM 52. The recording medium 54 is configured using, for example, a volatile memory such as an SDRAM (Synchronous DRAM), an HDD (hard disk drive), or an SSD (solid state drive). The memory 16 according to the present embodiment is implemented by the recording medium 54. Further, the display I/F circuit 56 corresponds to the display I/F unit 17 according to the present embodiment. The transmitter/receiver I/F circuit 55 is used for both signal transfer between the signal processor 10 and the transmitter 20, and signal transfer between the memory 16 and the receiver 30.

The transmitter 20 has a signal generator 22 that generates an excitation signal with a high frequency using a command signal supplied from the information processing device 50 as a trigger signal, and has an amplifier 23 that amplifies the excitation signal and outputs the excitation signal to the transducer probe 21. On the other hand, the receiver 30 has an amplifier 32 that amplifies the detected signal inputted thereto from the receiver probe 31, and an A/D converter 33 that A/D converts the amplified detected signal and outputs a digital received signal. On the condition that the information processing device 50 has either an analog circuit that detects the signal intensities $I_1$ and $I_2$ on the basis of the detected signal, or an analog circuit that detects the signal intensity ratio $I_2/I_1$ on the basis of the detected signal, the A/D converter 33 is unnecessary.

As described above, the ultrasonic measurement apparatus 1 of the present embodiment can compare the signal intensity of a waveform part corresponding to a first propagation mode among the propagation modes of plate waves UW and the signal intensity of a waveform part corresponding to a second propagation mode among the propagation modes, with each other, and can estimate a property/state of the ultrasonic-wave propagation medium of the test object 100 on the basis of a result of the comparison with high accuracy. Particularly, it is possible to estimate a property/state of the interlayer portion 102 in the test object 100 with high accuracy. Such estimation has been difficult by a visual inspection and an impact-echo method.

Embodiment 2

Figure 19:
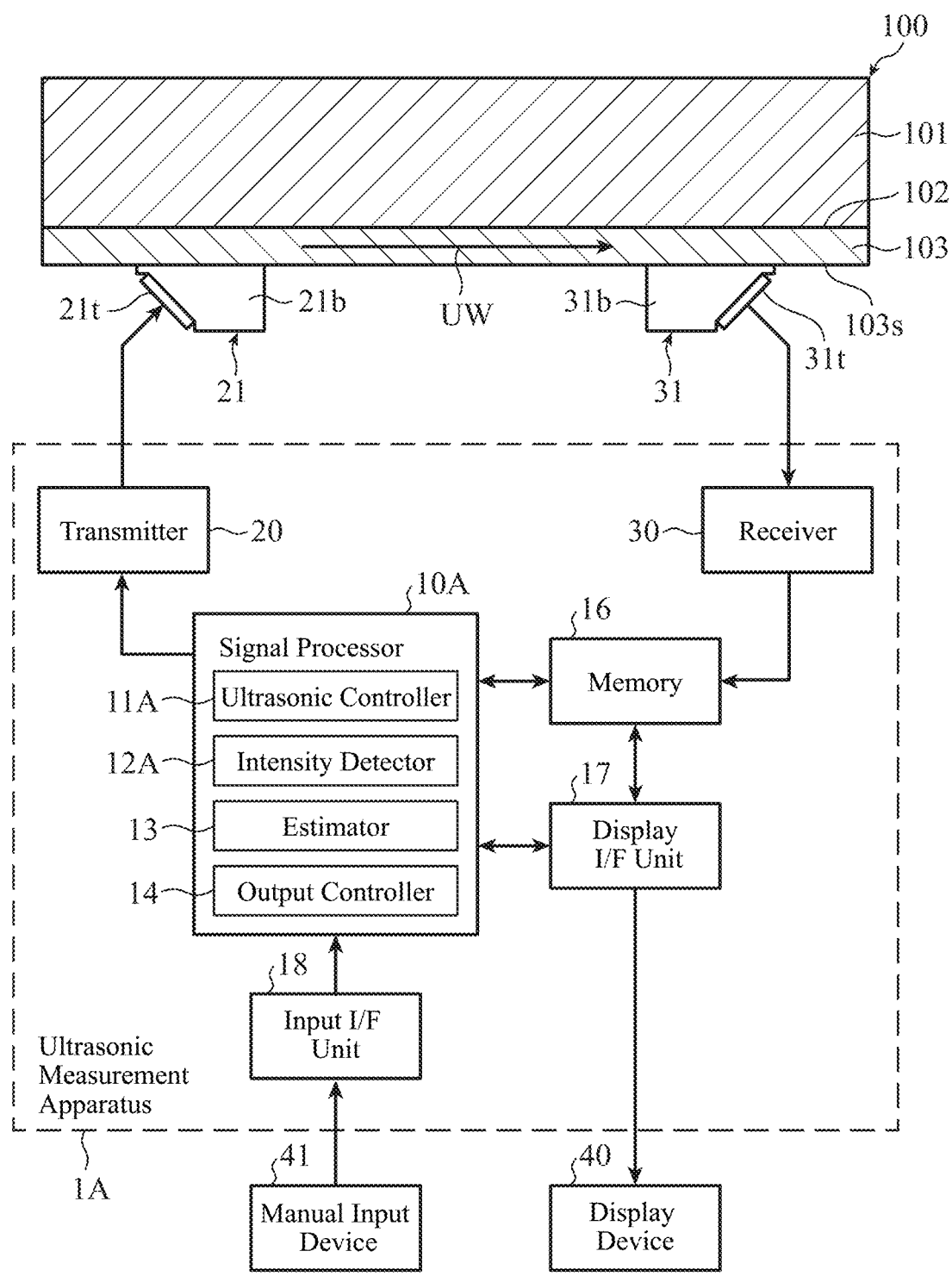
FIG. 19 is a block diagram showing the schematic configuration of an ultrasonic measurement system according to Embodiment 2 of the present invention.

Next, Embodiment 2 according to the present invention will be described. FIG. 19 is a block diagram showing the schematic configuration of an ultrasonic measurement system that is Embodiment 2 according to the present invention. The ultrasonic measurement system according to the present embodiment includes a transducer probe 21 and a receiver probe 31, like the ultrasonic measurement system (FIG. 1) of Embodiment 1 described above. The ultrasonic measurement system of the present embodiment further includes an ultrasonic measurement apparatus 1A, and the ultrasonic measurement apparatus 1A has a signal processor 10A, a memory 16, a display I/F unit 17, an input interface unit (input I/F unit) 18, a transmitter 20, and a receiver 30. The configuration of the ultrasonic measurement apparatus 1A is the same as that of the ultrasonic measurement apparatus 1 according to above-mentioned Embodiment 1, with the exception that the input I/F unit 18 is added, and the signal processor 10A has an ultrasonic controller 11A and a intensity detector 12A which are shown in FIG. 19, instead of the ultrasonic controller 11 and the intensity detector 12 which are shown in FIG. 1.

A manual input device 41 has a function of receiving an input provided by a user's manipulation, and supplying an electric signal indicating the manipulation's input to the signal processor 10A. Therefore, the signal processor 10A is capable of receiving the input provided by the user's manipulation via the input I/F unit 18. As the manual input device 41, for example, an input device capable of receiving a key input, a button input or a touch input (such as a keyboard, a pointing device or a touch pad) can be used.

A user can manipulate the manual input device 41 to thereby specify a desired inspection mode among two or more types of preset inspection modes. The ultrasonic measurement apparatus 1A according to the present embodiment selects the inspection mode specified by a user from among the several types of inspection modes or selects an inspection mode which is automatically specified as a default option, from among the several types of inspection modes when no specification is performed by any user, and operates in accordance with the selected inspection mode. Each of the inspection modes is one for determining a set of parameters showing "the frequency of an excitation signal supplied to a vibrator 21t", "a time window (i.e., a gate period Gate1) which is set up on the basis of the group-velocity dispersion characteristics of a first propagation mode", and "a time window (i.e., a gate period Gate2) which is set up on the basis of the group-velocity dispersion characteristics of a second propagation mode." A set of these parameters is stored in a storage area (not illustrated) in the signal processor 10A.

As a combination of the first and second propagation modes, a set of different types of propagation modes having group-velocity dispersion characteristics which are different for a propagation medium of a test object 100 (e.g., a set of a symmetric mode and an anti-symmetric mode, a set of symmetric modes whose orders are different from each other, or a set of anti-symmetric modes whose orders are different from each other) can be selected. In this case, the gate periods Gate1 and Gate2 are selected in such a way that they do not overlap each other. As an alternative, as a combination of the first and second propagation modes, a set of the same types of propagation modes having group-velocity dispersion characteristics which are the same for the propagation medium of the test object 100 (e.g., a set of S0 modes) can be selected. In this case, the gate periods Gate1 and Gate2 are selected in such a way that they do not overlap each other, and only waveform parts of frequency components having different group velocities are sampled.

The ultrasonic controller 11A uses either an inspection mode specified by the user (hereinafter referred to as the "selected inspection mode") and an inspection mode automatically specified as a default option, and supplies a command signal for generating an excitation signal having a frequency determined by the selected inspection mode to the transmitter 20. The transmitter 20 generates an excitation signal having a frequency specified by the command signal, and supplies the excitation signal to the transducer probe 21. The vibrator 21t generates an ultrasonic wave in accordance with the excitation signal in the above-mentioned way. The ultrasonic wave is injected into a second member 103 from an oblique direction via a wedge 21b and a coupling medium (not illustrated). The second member 103 converts the ultrasonic wave injected into the second member, into plate waves UW of propagation modes, and allows these plate waves UW to propagate toward the receiver probe 31. A vibrator 31t of the receiver probe 31 converts the plate waves UW propagated thereto via a coupling medium (not illustrated) and a wedge 31b into a detected signal, and supplies the detected signal to the receiver 30. The receiver 30 receives the detected signal from the receiver probe 31, and outputs a received signal showing a time-domain waveform of the detected signal, i.e., a received signal waveform. The memory 16 then stores data about the received signal.

The intensity detector 12A samples a first waveform part appearing in the gate period Gate1 determined by the selected inspection mode from the received signal read from the memory 16, and also samples a second waveform part appearing in the gate period Gate2 determined by the selected inspection mode from the received signal. The intensity detector 12A further detects the signal intensity $I_1$ of the sampled first waveform part and also detects the signal intensity $I_2$ of the sampled second waveform part, like the intensity detector 12 of Embodiment 1 described above.

A estimator 13 can compare the signal intensities $I_1$ and $I_2$ detected by the intensity detector 12A with each other, and can estimate a property/state of the propagation medium through which the plate waves UW of the multiple modes propagate, on the basis of a result of the comparison. Specifically, the estimator 13 can estimate a property/state of the propagation medium on the basis of the signal intensity ratio $I_2/I_1$. The signal intensity ratio $I_2/I_1$ can be either an amplitude ratio or an energy ratio.

Figure 20A:
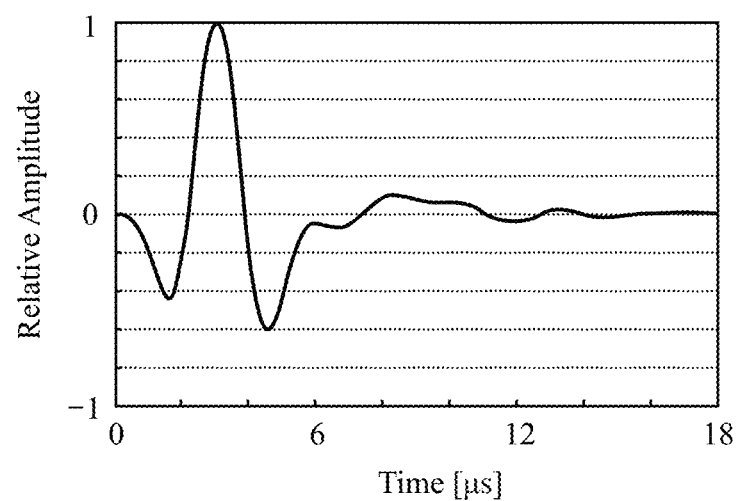
FIGS. 20A and 20B are graphs showing the response characteristics of probes used in a simulation in Embodiment 2.
Figure 20B:
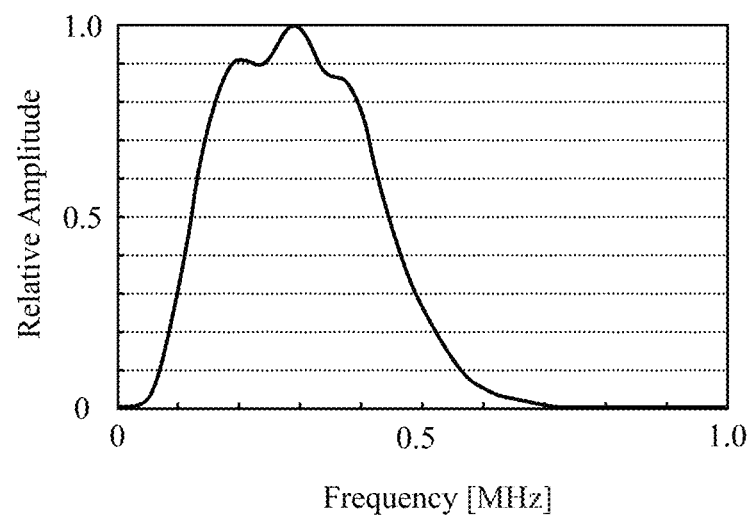

Next, a simulation performed using a computer will be explained. FIGS. 20A and 20B are graphs showing an example of the response characteristics of the transducer probe 21 and the receiver probe 31 used in the simulation. These response characteristics are measured in a state in which the transducer probe 21 and the receiver probe 31 are in direct contact with each other. FIG. 20A is a graph showing a time domain response characteristic which is measured when a 100 kHz excitation signal is supplied to the transducer probe 21. In the graph, the horizontal axis shows a time (unit: microseconds), and the vertical axis shows relative amplitude in a linear scale. FIG. 20B is a graph showing a frequency domain response characteristic corresponding to the time domain response characteristic shown in FIG. 20A. In the graph, the horizontal axis shows the frequency (unit: MHz) of the ultrasonic wave, and the vertical axis shows relative amplitude in a linear scale. It is seen that the response characteristic shown in FIG. 20B is shifted toward a lower frequency in comparison with the response characteristic shown in FIG. 5B.

In the simulation concerning Embodiment 1 described above, a 500 kHz excitation signal is supplied to the transducer probe 21, and the receiver probe 31 functions as a filter that allows an ultrasonic signal in a frequency band centered at 500 kHz to pass therethrough. In contrast, in the simulation concerning the present embodiment, a 100 kHz excitation signal is supplied to the transducer probe 21, and the receiver probe 31 functions as a filter that allows an ultrasonic signal in a frequency band centered at 100 kHz to pass therethrough. In this way, the propagation modes of the plate waves UW which propagate through the inside of the test object 100 can be controlled by changing the frequency of the excitation signal, and the propagation modes appearing in the received signal waveform can be controlled by changing the pass band of the filter. A propagation mode, which hardly occurs when the frequency of the excitation signal is set to 500 kHz, occurs when the frequency of the excitation signal is set to 100 kHz (which will be described later as an S0f mode).

FIGS. 21A to 21D are diagrams showing results of a simulation performed using the transducer probe 21 and the receiver probe 31 which have the response characteristics shown in FIGS. 20A and 20B. In the simulation, it is assumed that an interlayer portion 102 is an air layer having a thickness δ of 0.2 mm. Further, a steel plate having a thickness of Dt=6 mm is selected as the second member 103 (FIG. 4) that allows plate waves UW to propagate therethrough, like in the case of Embodiment 1 described above. As material constants of a first member 101, a longitudinal wave sound velocity of 4,200 m/s, a transverse wave sound velocity of 2,000 m/s, and a density of 2,300 kg/m$^3$ are selected. Further, the spacing L0 (FIG. 4) between the transducer probe 21 and the receiver probe 31 is set to 150 mm. The size L1 (FIG. 4) of each of the vibrators 21*t* and 31*t* is 20 mm. The vibrator 21*t* emits an ultrasonic wave which is a longitudinal wave. The incident angle of the longitudinal wave onto a surface 103*s* of the second member 103 (the angle between the direction normal to the surface 103*s* and the propagation direction of the longitudinal wave) is 46 degrees. Further, the sound velocity at each of the wedges 21*b* and 31*b* is 2,360 m/s.

Figure 21A:
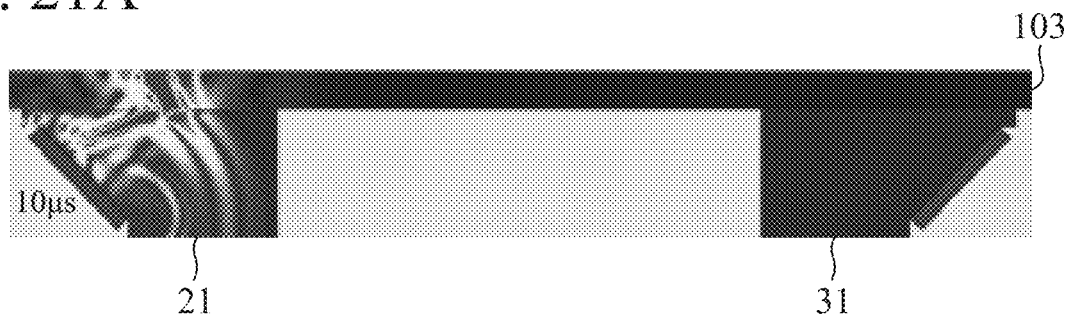
FIGS. 21A to 21D are diagrams showing a result of a simulation which is performed in a case in which an interlayer portion is an air layer.
Figure 21B:
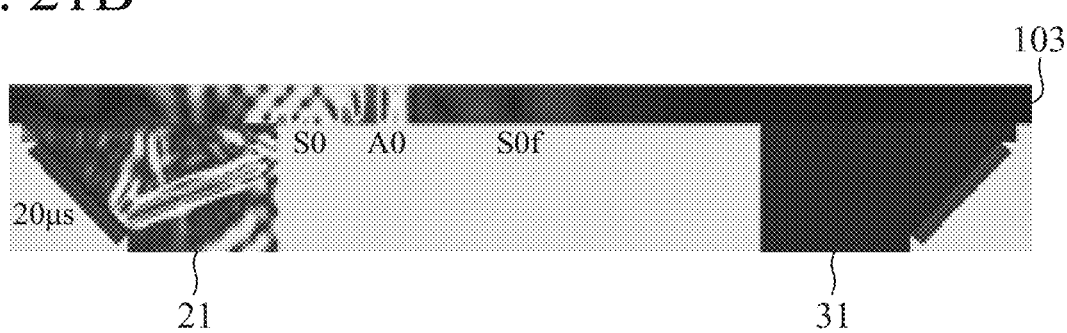
Figure 21C:
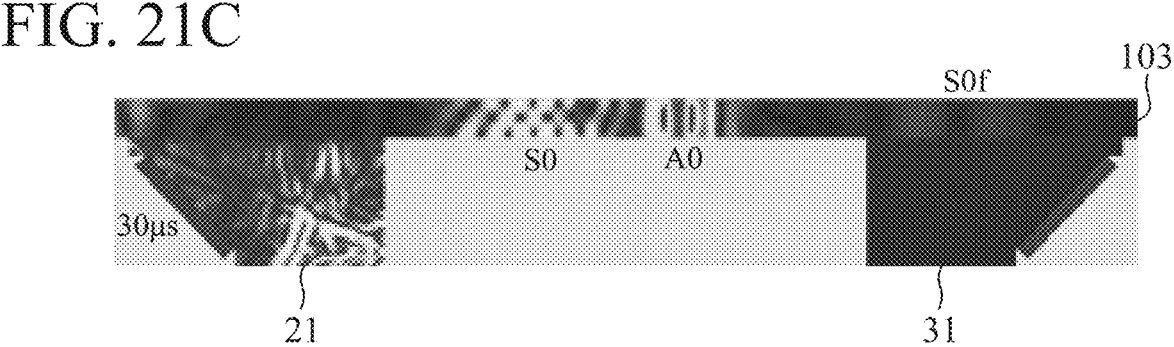
Figure 21D:
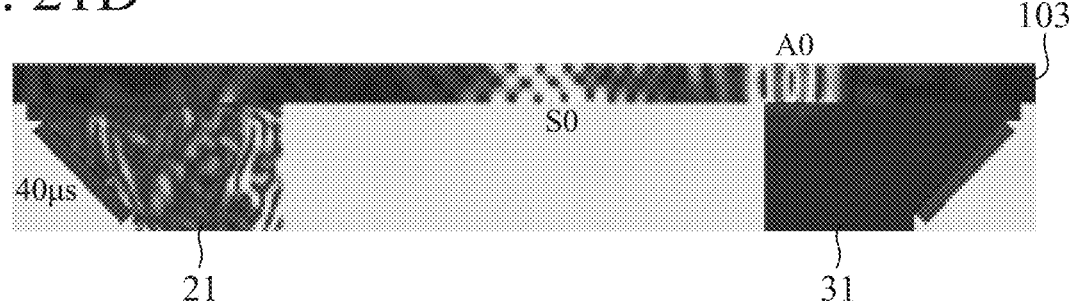

FIG. 21A shows a simulation result of a sound field (wave) when 10 microseconds have elapsed since the start of emission of an ultrasonic wave, FIG. 21B shows a simulation result of the sound field when 20 microseconds have elapsed, FIG. 21C shows a simulation result of the sound field when 30 microseconds have elapsed, and FIG. 21D shows a simulation result of the sound field when 40 microseconds have elapsed. In FIGS. 21A to 21D, the amplitude of the ultrasonic wave is displayed in shades of gray. Referring to FIG. 21B to 21D, a sound field denoted by a reference sign S0 shows a plate wave of the S0 mode, a sound field denoted by a reference sign A0 shows a plate wave of the A0 mode, and a sound field denoted by a reference sign S0f shows another plate wave of the S0 mode. For the sake of expediency in explanation, the S0 mode denoted by the reference sign S0f will be referred to as the S0f mode. It is seen that the S0f mode is the one in which the plate wave propagates faster than those of the S0 mode and A0 mode. Therefore, the group velocity of the S0f mode is higher than that of the S0 mode and that of the A0 mode.

Figure 22A:
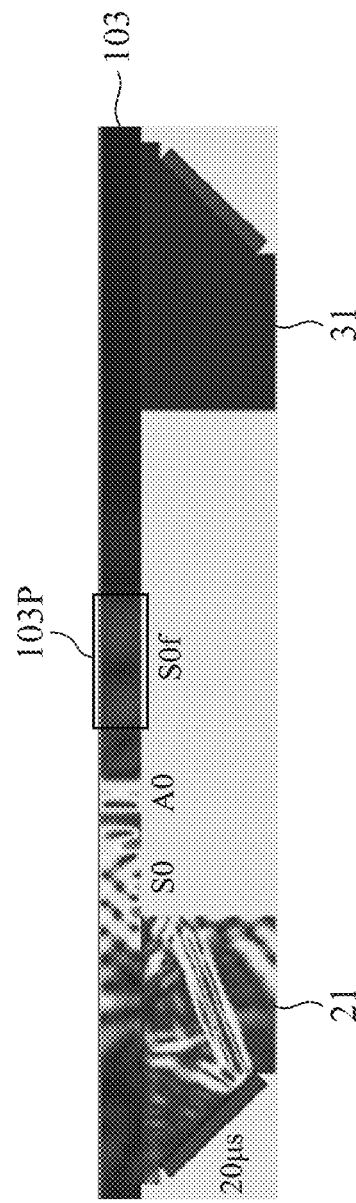
FIG. 22A is a diagram showing the same simulation result as that shown in FIG. 21B.
Figure 22B:
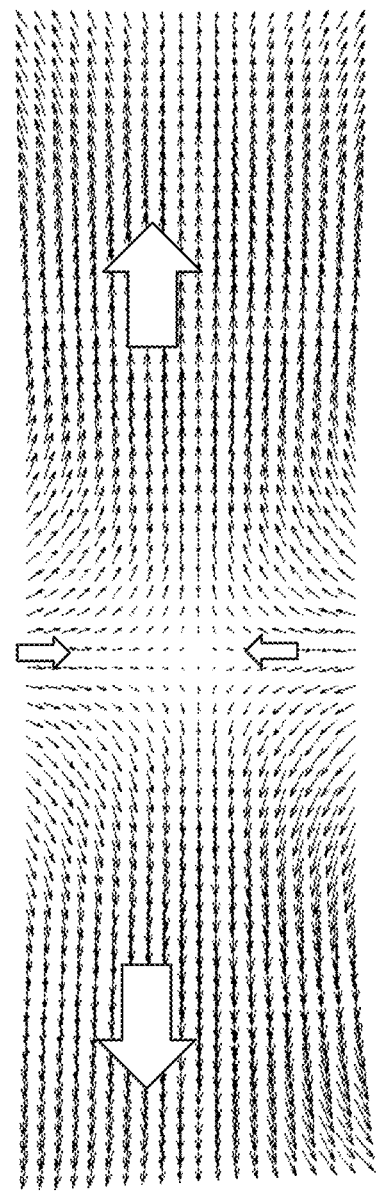
FIG. 22B is an enlarged view showing a displacement distribution of a portion 103P shown in FIG. 22A.

FIG. 22A is a diagram showing the same simulation result as that shown in FIG. 21B, and FIG. 22B is an enlarged view showing a displacement distribution of a portion 103P of the second member 103 through which the plate wave of the S0f mode shown in FIG. 22A propagates. Because the portion 103P is symmetrically displaced in a direction (vertical direction of the drawing) perpendicular to the propagation direction of the plate wave, as shown in FIG. 22B, the S0f mode is a fundamental mode having a frequency different from that of the S0 mode to which the reference sign S0 is attached. As shown in the dispersion curves GS0 and GA0 of FIG. 3, when the frequency is lower than 0.3 MHz, the plate wave of the S0 mode propagates faster than that of the A0 mode. Because the frequency of the excitation signal supplied to the transducer probe 21 is set to 100 kHz, propagation of the S0 mode, that is the S0f mode, having a frequency lower than 0.3 MHz occurs.

Figure 23:
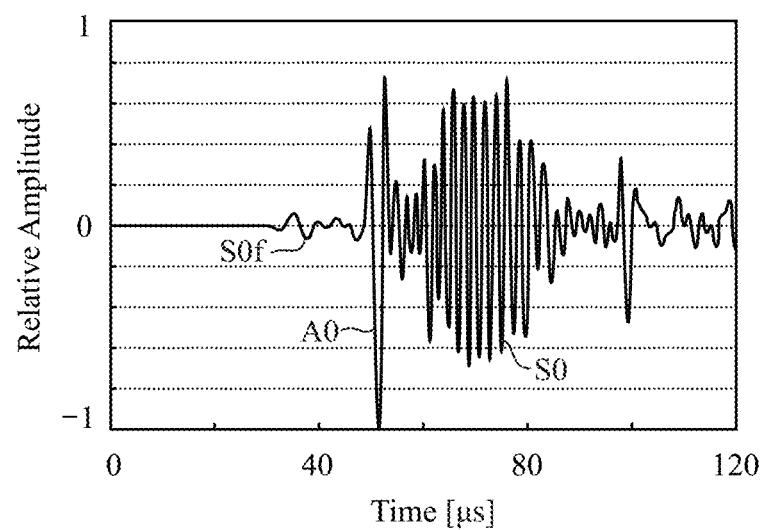
FIG. 23 is a graph showing a time-domain waveform (received signal waveform) obtained by detecting plate waves shown in FIG. 21A to FIG. 21D.

FIG. 23 is a graph showing a time-domain waveform (received signal waveform) which is obtained by detecting the plate waves shown in FIGS. 21A and 21D. The interlayer portion 102 is an air layer. In the graph shown in FIG. 23, the horizontal axis shows an elapsed time (unit: microseconds), and the vertical axis shows relative amplitude. Further, a waveform part denoted by a reference sign A0 shows a result of the detection of the plate wave of the A0 mode, a waveform part denoted by a reference sign S0 shows a result of the detection of the plate wave of the S0 mode, and a waveform part denoted by a reference sign S0f shows a result of the detection of the plate wave of the S0f mode. As shown in FIG. 23, the plate wave of the S0f mode is received before the plate wave of the A0 mode is received. Further, the plate waves of the three modes, the S0 mode, A0 mode and S0f mode, propagate.

Next, a simulation performed on the assumption that the interlayer portion 102 is immersed in water will be explained. FIGS. 24A to 24D are diagrams showing results of the simulation in the case in which the interlayer portion 102 is immersed in water. Conditions imposed on the simulation are the same as those used with regard to FIGS. 21A to 21D, with the exception that the interlayer portion 102 is immersed in water.

Figure 24A:
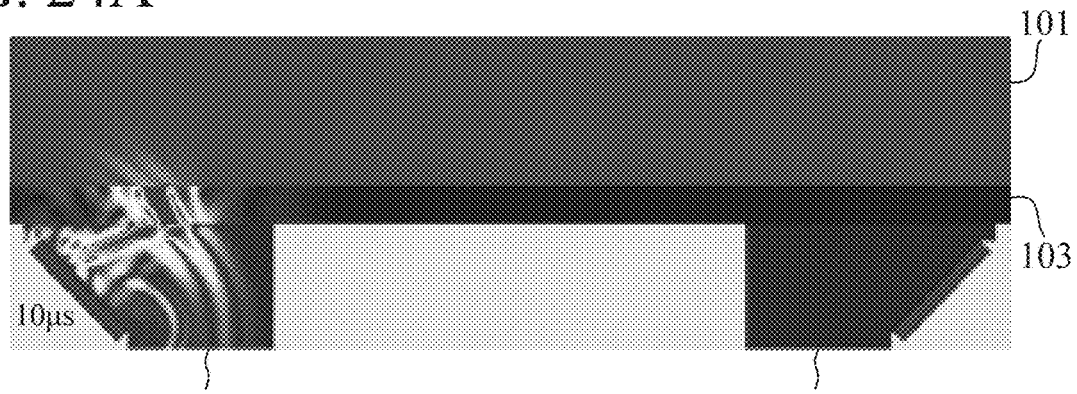
FIGS. 24A to 24D are diagrams showing a result of a simulation which is performed in a case in which the interlayer portion is immersed in water.
Figure 24B:
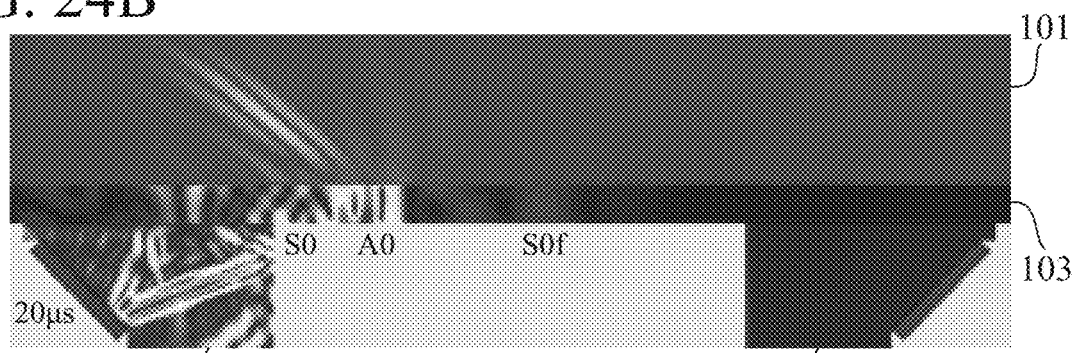
Figure 24C:
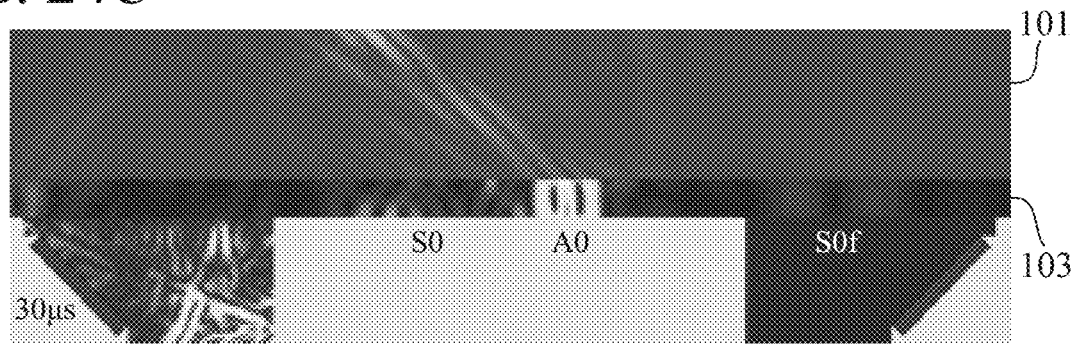
Figure 24D:
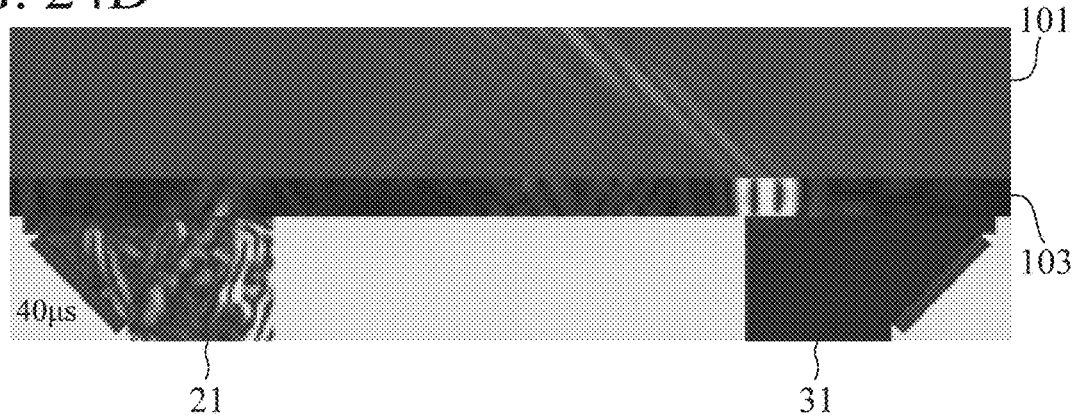

FIG. 24A shows a simulation result of a sound field (wave) when 10 microseconds have elapsed since the start of emission of an ultrasonic wave, FIG. 24B shows a simulation result of the sound field when 20 microseconds have elapsed, FIG. 24C shows a simulation result of the sound field when 30 microseconds have elapsed, and FIG. 24D shows a simulation result of the sound field when 40 microseconds have elapsed. In FIGS. 24A to 24D, the amplitude of the ultrasonic wave is displayed in shades of gray. A sound field denoted by a reference sign S0 shows the plate wave of the S0 mode, a sound field denoted by a reference sign A0 shows the plate wave of the A0 mode, and a sound field denoted by a reference sign S0f shows the other plate wave of the S0 mode.

Figure 25:
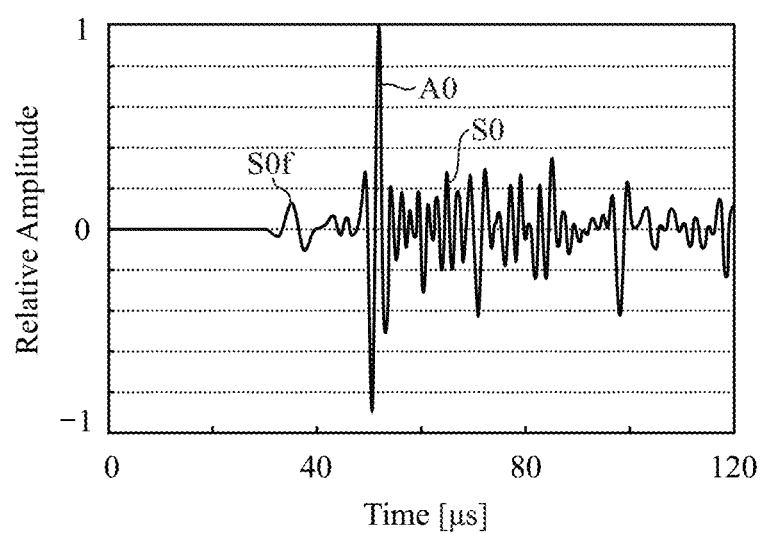
FIG. 25 is a graph showing a time-domain waveform (received signal waveform) obtained by detecting plate waves shown in FIG. 24A to FIG. 24D.

It is seen that in the case in which the interlayer portion 102 is immersed in water, there occurs a situation in which the plate waves of the S0f mode, A0 mode and S0 mode propagate, as shown in FIGS. 24A to 24D, like in the case in which the interlayer portion 102 is an air layer. FIG. 25 is a graph showing a time-domain waveform (received signal waveform) which is obtained by detecting the plate waves shown in FIGS. 24A to 24D. In the graph shown in FIG. 25, the horizontal axis shows an elapsed time (unit: microseconds), and the vertical axis shows relative amplitude. Further, a waveform part denoted by a reference sign A0 shows a result of the detection of the plate wave of the A0 mode, a waveform part denoted by a reference sign S0 shows a result of the detection of the plate wave of the S0 mode, and a waveform part denoted by a reference sign S0f shows a result of the detection of the plate wave of the S0f mode. As shown in FIG. 25, the amplitude of the waveform part of the S0f mode is relatively large compared with that in the waveform shown in FIG. 22. This is because, in the S0f mode, the amount of displacement in a horizontal direction is large and the amount of displacement in a vertical direction is small as shown in FIG. 22B, which causes the amount of energy leakage into water at an immersed point to be decreased. In contrast, because in the A0 mode and S0 mode, the amount of displacement in a vertical direction is large as shown in FIG. 7B, the amount of energy leakage into water is large.

Next, a simulation performed on the assumption that the first member 101 and the second member 103 are in absolute contact with each other will be explained. FIGS. 26A to 26D are diagrams showing results of the simulation in the case in which the first member 101 and the second member 103 are in absolute contact with each other, i.e., the thickness of the interlayer portion 102 is zero. Conditions imposed on the simulation are the same as those used with regard to FIG. 21A to FIG. 21D, with the exception that the first member 101 and the second member 103 are in absolute contact with each other.

Figure 26A:
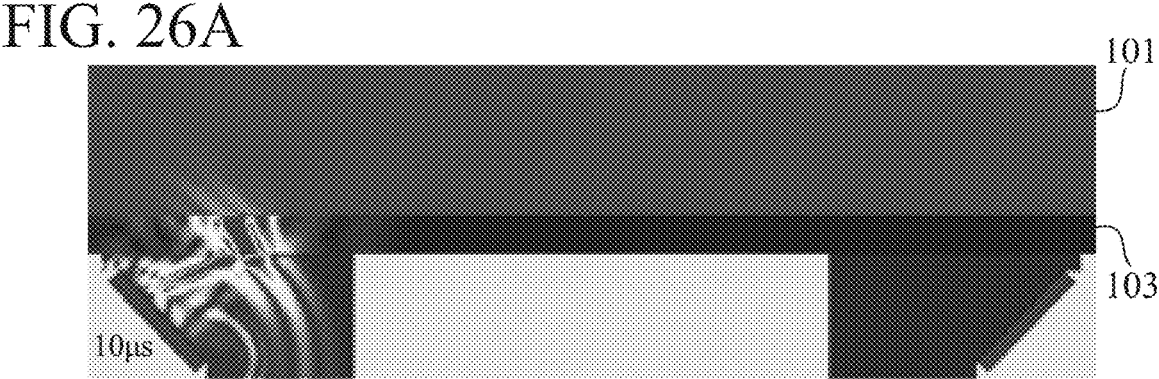
FIGS. 26A to 26D are diagrams showing a result of a simulation which is performed in a case in which the thickness of the interlayer portion is zero.
Figure 26B:
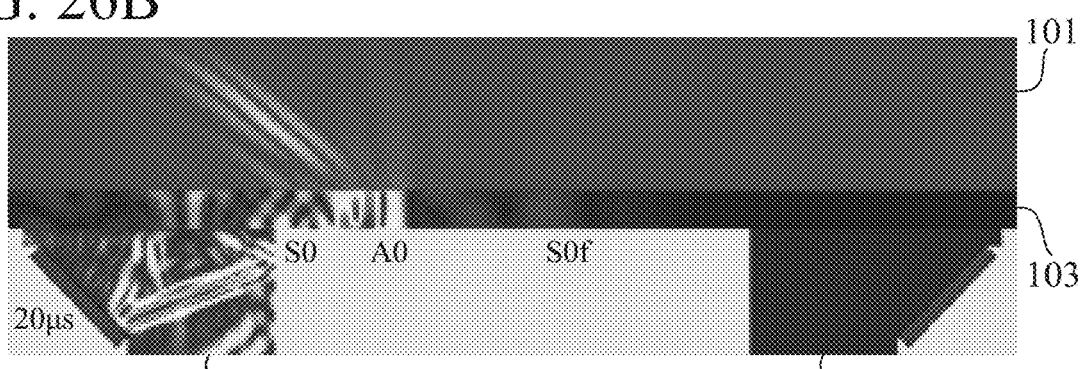
Figure 26C:
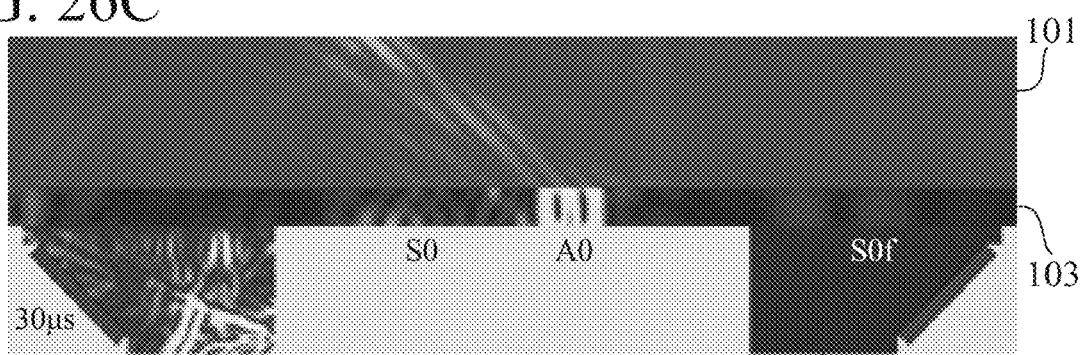
Figure 26D:
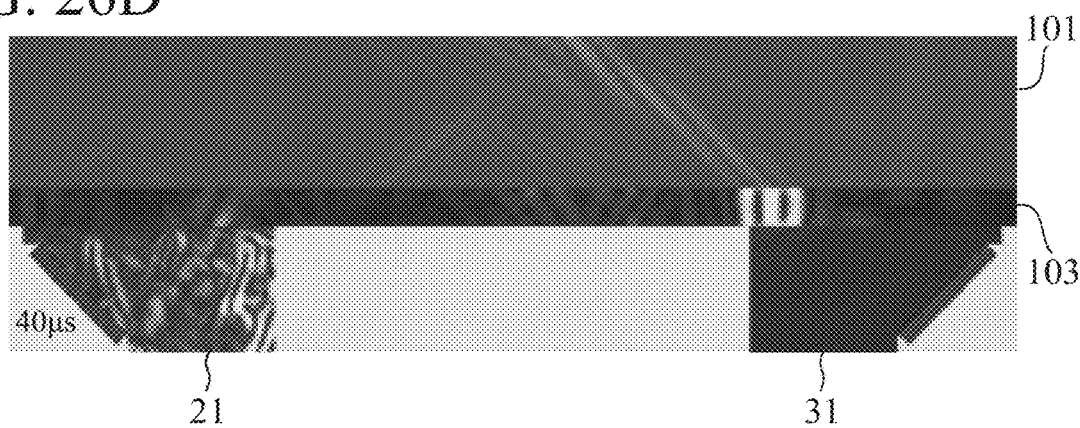

FIG. 26A shows a simulation result of a sound field (wave) when 10 microseconds have elapsed since the start of emission of an ultrasonic wave, FIG. 26B shows a simulation result of the sound field when 20 microseconds have elapsed, FIG. 26C shows a simulation result of the sound field when 30 microseconds have elapsed, and FIG. 26D shows a simulation result of the sound field when 40 microseconds have elapsed. In FIGS. 26A to 26D, the amplitude of the ultrasonic wave is displayed in shades of gray. Further, a sound field denoted by a reference sign S0 shows the plate wave of the S0 mode, a sound field denoted by a reference sign A0 shows the plate wave of the A0 mode, and a sound field denoted by a reference sign S0f shows the other plate wave of the S0 mode.

Figure 27:
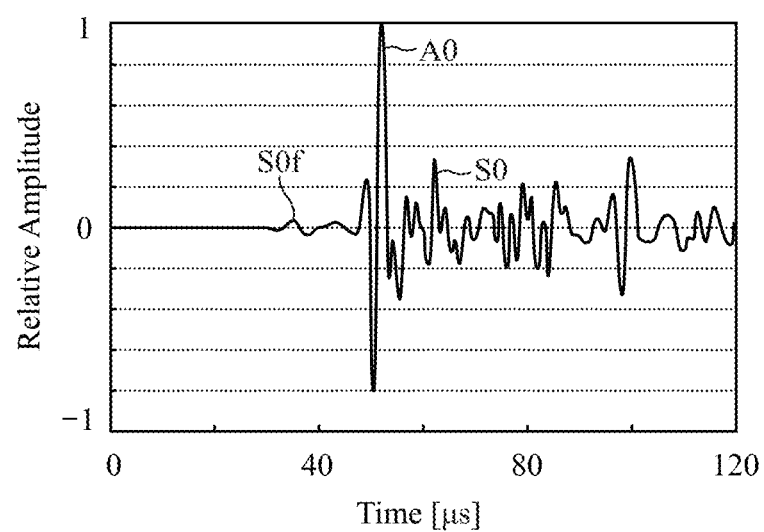
FIG. 27 is a graph showing a time-domain waveform (received signal waveform) obtained by detecting plate waves shown in FIG. 26A to FIG. 26D.

It is seen that in the case in which the first member 101 and the second member 103 are in absolute contact with each other, there occurs a situation in which the plate waves of the S0f mode, A0 mode and S0 mode propagate, as shown in FIGS. 26A to 26D, like in the case in which the interlayer portion 102 is an air layer. FIG. 27 is a graph showing a time-domain waveform (received signal waveform) which is obtained by detecting the plate waves shown in FIGS. 26A to 26D. In the graph shown in FIG. 26, the horizontal axis shows an elapsed time (unit: microseconds), and the vertical axis shows relative amplitude. Further, a waveform part denoted by a reference sign A0 shows a result of the detection of the plate wave of the A0 mode, a waveform part denoted by a reference sign S0 shows a result of the detection of the plate wave of the S0 mode, and a waveform part denoted by a reference sign S0f shows a result of the detection of the plate wave of the S0f mode. As shown in FIG. 27, the amplitude of the waveform part of the S0f mode is relatively small compared with that in the waveform shown in FIG. 25. By using the result, it can be estimated whether or not the first member 101 and the second member 103 are in absolute contact with each other, as will be mentioned later.

Figure 28:
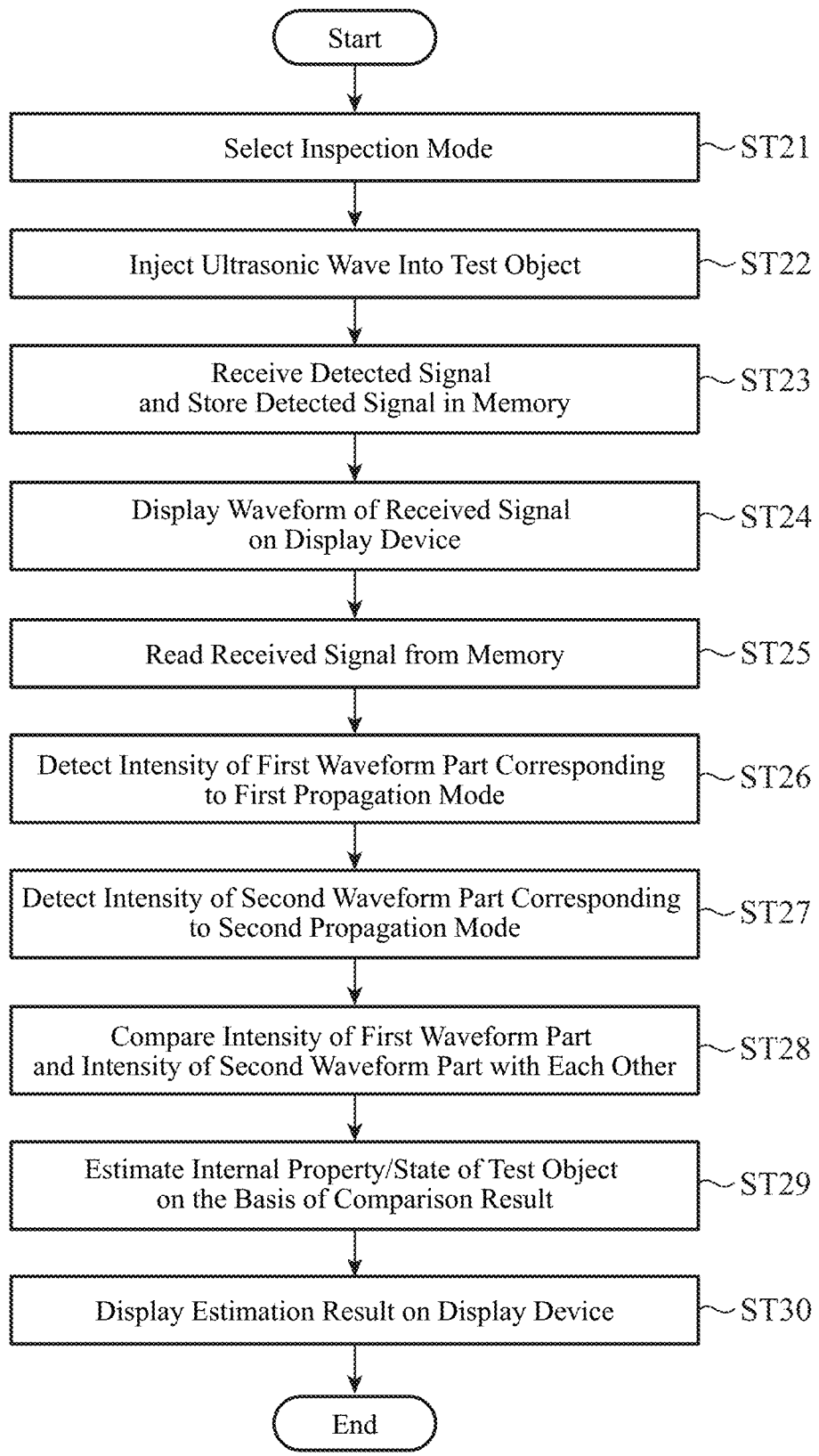
FIG. 28 is a flow chart showing an example of a procedure of ultrasonic measurement processing according to Embodiment 2.

Next, a procedure of ultrasonic measurement processing according to the present embodiment will be explained with reference to FIG. 28. FIG. 28 is a flow chart showing an example of the procedure of the ultrasonic measurement processing according to the present embodiment.

Referring to FIG. 28, the ultrasonic controller 11A selects an inspection mode (selected inspection mode) from among the several types of inspection modes which are prescribed in advance, and supplies a command signal for generating an excitation signal having a frequency defined by the selected inspection mode, to the transmitter 20 (step ST21). Next, the transmitter 20 supplies the excitation signal to the transducer probe 21 in accordance with the command signal from the ultrasonic controller 11A, thereby to inject an ultrasonic wave into the test object 100 (step ST22). As a result, plate waves UW of multiple modes are generated in the second member 103. The receiver 30 receives a detected signal from the receiver probe 31, and stores the detected signal in the memory 16 (step ST23). Thereafter, the output controller 14 controls the display I/F unit 17 to cause the display device 40 to display the received signal waveform indicated by the received signal (step ST24).

Next, the intensity detector 12A reads the received signal from the memory 16 (step ST25), and detects the signal intensity $I_1$ of a first waveform part corresponding to the first propagation mode from the received signal (step ST26). In a storage area of the signal processor 10A, the time window corresponding to the first propagation mode, i.e., the gate period Gate1 which is set up on the basis of the group-velocity dispersion characteristics of the first propagation mode is stored for each inspection mode. The intensity detector 12A can sample the first waveform part appearing in the gate period Gate1 determined for the selected inspection mode, from the received signal read from the memory 16, and calculate the signal intensity $I_1$ of the first waveform part (step ST26).

Next, the intensity detector 12A detects the signal intensity $I_2$ of a second waveform part corresponding to the second propagation mode from the received signal read from the memory 16 (step ST27). In the storage area of the signal processor 10A, the time window corresponding to the second propagation mode which pairs up with the first propagation mode, i.e., the gate period Gate2 which is set up on the basis of the group-velocity dispersion characteristics of the second propagation mode is stored for each inspection mode. The intensity detector 12A can sample the second waveform part appearing in the gate period Gate2 prescribed for the selected inspection mode, from the received signal read from the memory 16, and calculate the signal intensity $I_2$ of the second waveform part (step ST27).

Figure 29:
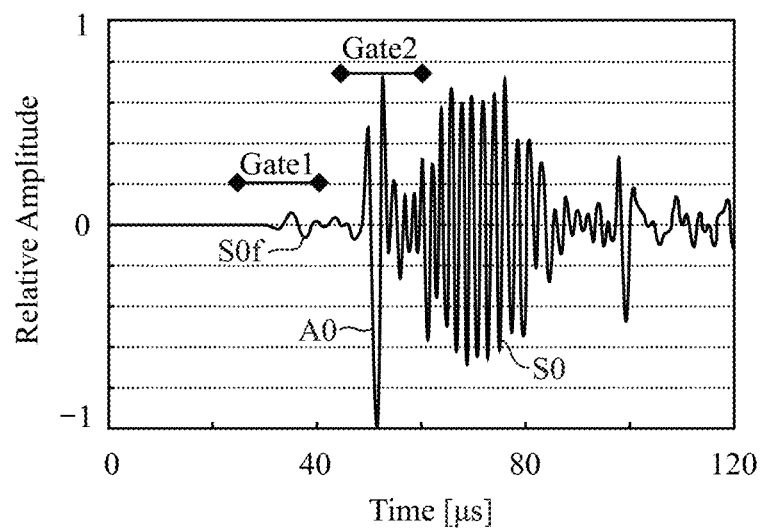
FIG. 29 is a graph showing an example of gate periods which are set up when a symmetric mode and an anti-symmetric mode are selected as first and second propagation modes.
Figure 30:
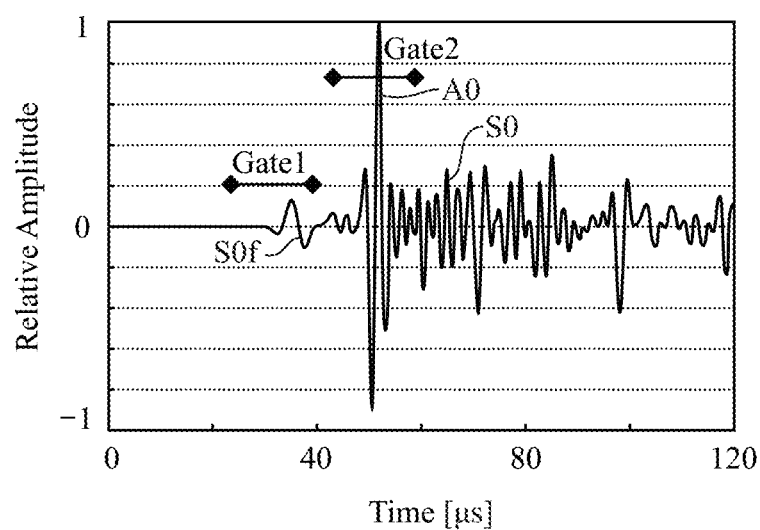
FIG. 30 is a graph showing another example of the gate periods which are set up when a symmetric mode and an anti-symmetric mode are selected as the first and second propagation modes.
Figure 31:
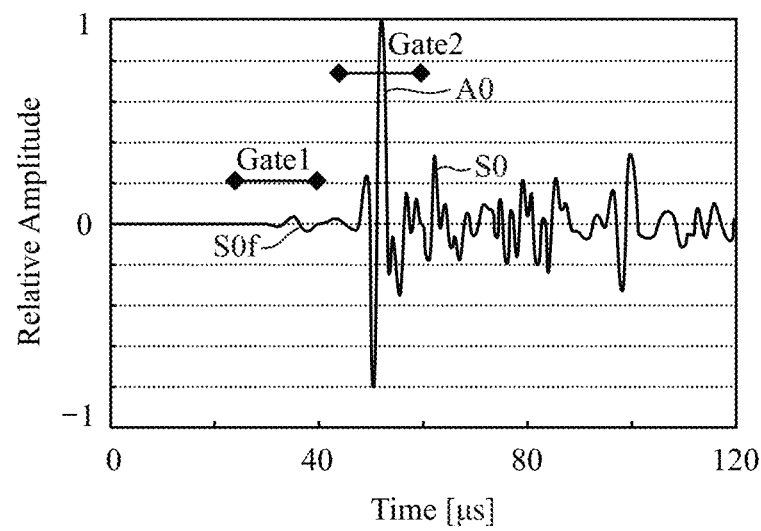
FIG. 31 is a graph showing a further example of the gate periods which are set up when a symmetric mode and an anti-symmetric mode are selected as the first and second propagation modes.

FIGS. 29 to 31 are diagrams showing an example of the gate periods Gate1 and Gate2 which are set up in a case where an S0f mode, which is a symmetric mode, is selected as the first propagation mode, and an A0 mode, which is an anti-symmetric mode, is selected as the second propagation mode. In this case, the intensity detector 12A detects the signal intensity $I_1$ of the first waveform part corresponding to the S0f mode from the received signal read from the memory 16 (step ST26), and also detects the signal intensity $I_2$ of the second waveform part corresponding to the A0 mode from the received signal (step ST27). FIG. 29 shows the gate periods Gate1 and Gate2 for the received signal waveform shown in FIG. 23 which is measured in the case in which the interlayer portion 102 is an air layer, FIG. 30 shows the gate periods Gate1 and Gate2 for the received signal waveform shown in FIG. 25 which is measured in the case in which the interlayer portion 102 is immersed in water, and FIG. 31 shows the gate periods Gate1 and Gate2 for the received signal waveform shown in FIG. 27 which is measured in the case in which the first member 101 and the second member 103 are in absolute contact with each other.

After steps ST26 and ST27 as described above are performed, the estimator 13 compares the signal intensity $I_1$ of the first propagation mode and the signal intensity $I_2$ of the second propagation mode with each other (step ST28), and estimates an internal property/state of the test object 100 on the basis of a result of the comparison (step ST29). In this regard, the estimator 13 can estimate an internal property/state of the test object 100 on the basis of the ratio between the signal intensity $I_1$ and the signal intensity $I_2$, like in the case of Embodiment 1 described above.

When the gate periods Gate1 and Gate2 are set up as shown in FIGS. 29 to 31, the estimator 13 can calculate, for example, the following amplitude ratio $A_2/A_1$ as the signal intensity ratio $I_2/I_1$.

In the case in which the interlayer portion 102 is an air layer (FIG. 29): $A_2/A_1=15.8$.

In the case in which the interlayer portion 102 is immersed in water (FIG. 30): $A_2/A_1=8.4$.

In the case in which the first member 101 and the second member 103 are in absolute contact with each other (FIG. 31): $A_2/A_1=26.9$.

The estimator 13 can compare the value of the amplitude ratio $A_2/A_1$ with one or more preset thresholds, and correctly can estimate which one of the above three cases is shown by the property/state of the interlayer portion 102 (step ST29).

After step ST29 is performed, the output controller 14 controls the display I/F unit 17, to cause the display device 40 to display a estimation result obtained by the estimator 13 (step ST30). At this time, on the single screen of the display device 40, an image showing the estimation result can be displayed in parallel with an image of the received signal waveform displayed in step ST24, or can be displayed while being superimposed on the image of the received signal waveform. Therefore, an operator can simultaneously check both the estimation result and the received signal waveform to correctly grasp the property/state of the test object 100. Thereafter, the ultrasonic measurement processing is ended.

Figure 32:
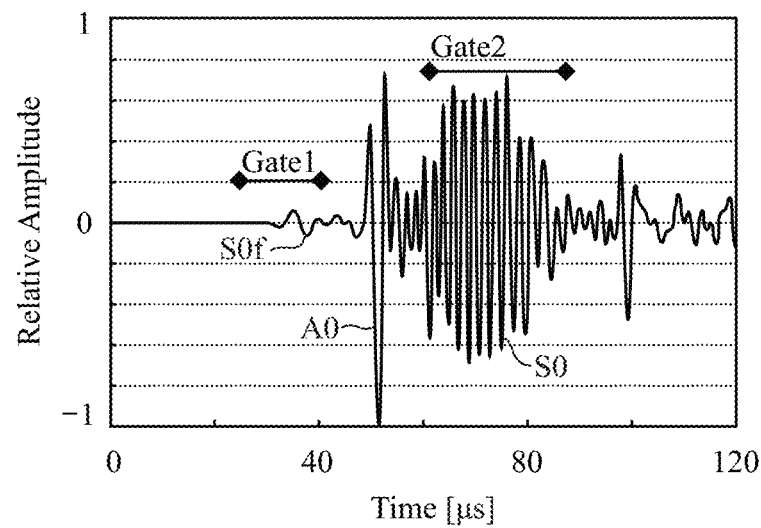
FIG. 32 is a graph showing an example of the gate periods which are set up when a set of symmetric modes is selected as the first and second propagation modes.
Figure 33:
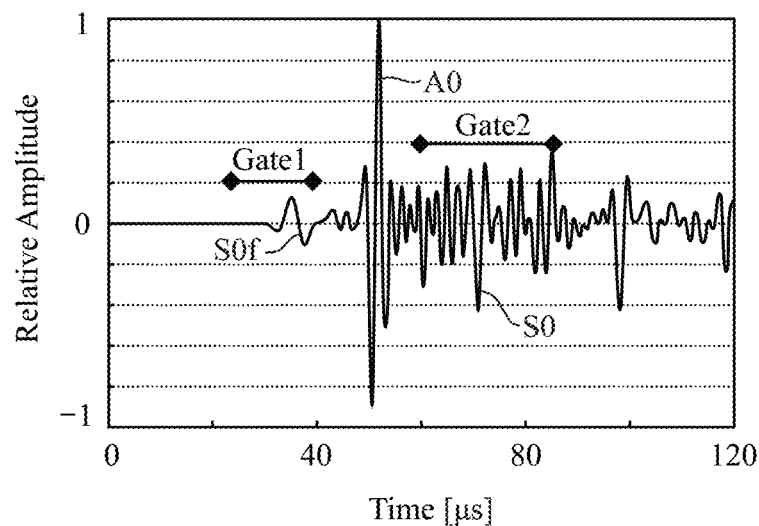
FIG. 33 is a graph showing another example of the gate periods which are set up when a set of symmetric modes is selected as the first and second propagation modes.
Figure 34:
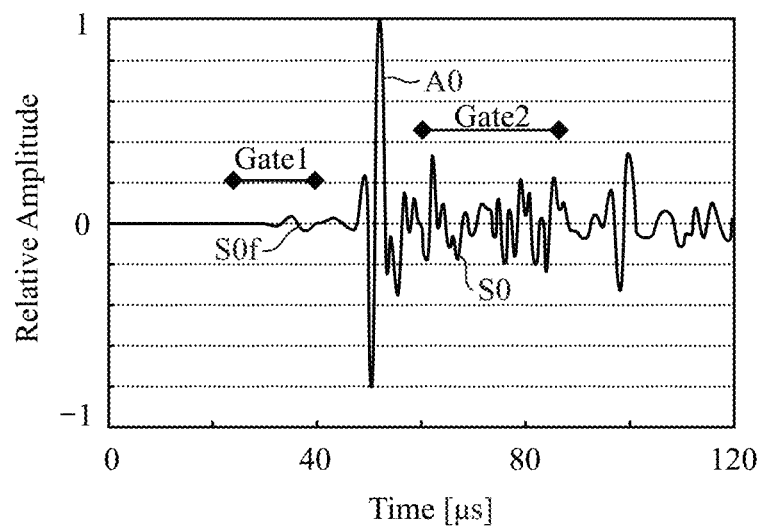
FIG. 34 is a graph showing a further example of the gate periods which are set up when a set of symmetric modes is selected as the first and second propagation modes.

In the examples shown in FIGS. 29 to 31, the S0f mode which is a symmetric mode is selected as the first propagation mode, and the A0 mode which is an anti-symmetric mode is selected as the second propagation mode. As an alternative, the S0f mode which is a symmetric mode can be selected as the first propagation mode, and the S0 mode which is the same type of symmetric mode as the S0f mode can be selected as the second propagation mode. FIGS. 32 to 34 are diagrams showing an example of the gate periods Gate1 and Gate2 which are set up in this case. At this time, the intensity detector 12A detects the signal intensity $I_1$ of a first waveform part corresponding to the S0f mode from the received signal read from the memory 16 (step ST26), and also detects the signal intensity $I_2$ of a second waveform part corresponding to the S0 mode from the received signal (step ST27).

FIG. 32 shows the gate periods Gate1 and Gate2 for the received signal waveform shown in FIG. 23 which is measured in the case in which the interlayer portion 102 is an air layer, FIG. 33 shows the gate periods Gate1 and Gate2 for the received signal waveform shown in FIG. 25 which is measured in the case in which the interlayer portion 102 is immersed in water, and FIG. 34 shows the gate periods Gate1 and Gate2 for the received signal waveform shown in FIG. 27 which is measured in the case in which the first member 101 and the second member 103 are in absolute contact with each other.

When the gate periods Gate1 and Gate2 are set up as shown in FIGS. 32 to 34, the estimator 13 can calculate, for example, the following amplitude ratio $A_2/A_1$ as the signal intensity ratio $I_2/I_1$.

In the case in which the interlayer portion 102 is an air layer (FIG. 32): $A_2/A_1=11.4$.

In the case in which the interlayer portion 102 is immersed in water (FIG. 33): $A_2/A_2=3.7$.

In the case in which the first member 101 and the second member 103 are in absolute contact with each other (FIG. 34): $A_2/A_1=9.0$.

The estimator 13 can compare the value of the amplitude ratio $A_2/A_1$ with one or more preset thresholds, and correctly estimate which one of the above three cases is shown by the property/state of the interlayer portion 102 (step ST29).

Figure 35:
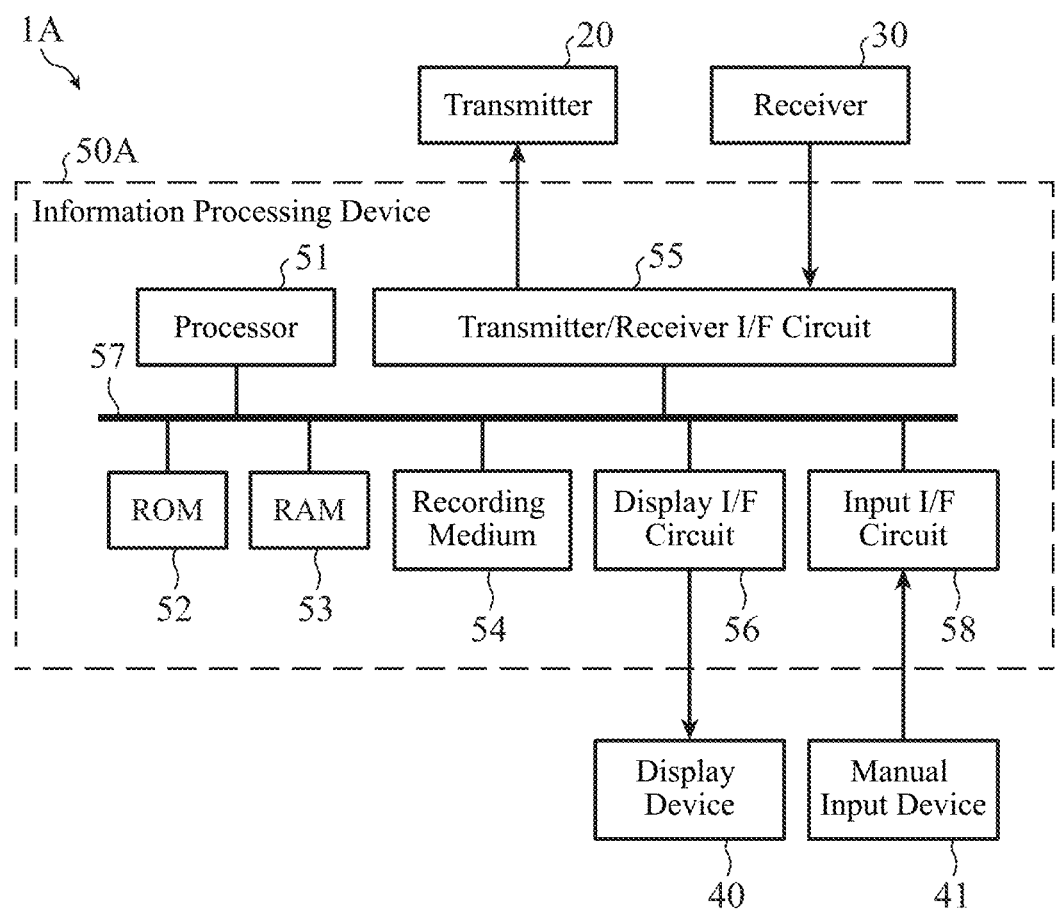
FIG. 35 is a diagram showing an example of the hardware configuration of an ultrasonic measurement apparatus according to Embodiment 2.

A hardware configuration of the above-mentioned ultrasonic measurement apparatus 1A can be implemented using, for example, either a computer in which a CPU is mounted, or an LSI such as a DSP, ASIC or FPGA, like that of the ultrasonic measurement apparatus 1 of Embodiment 1. FIG. 35 is a block diagram schematically showing an example of the hardware configuration of the ultrasonic measurement apparatus 1A of Embodiment 2. In the example shown in FIG. 35, the ultrasonic measurement apparatus 1A includes the transmitter 20, the receiver 30, and an information processing device 50A. The information processing device 50A has a processor 51 including a CPU, a ROM 52, a RAM 53, a recording medium 54, a transmitter/receiver I/F circuit 55, a display I/F circuit 56, and an input I/F circuit 58. The processor 51, the ROM 52, the RAM 53, the recording medium 54, the transmitter/receiver I/F circuit 55, the display I/F circuit 56, and the input I/F circuit 58 are connected to one another via a signal path 57 such as a bus circuit. The signal processor 10A, the memory 16, the display I/F unit 17, and the input I/F unit 18 according to the present embodiment can be implemented by the information processing device 50A. The processor 51 can implement the function of the signal processor 10A by using the RAM 53 as a working memory and executing a computer program for ultrasonic measurement which is read from the ROM 52. The input I/F circuit 58 corresponds to the input I/F unit 18 according to the present embodiment.

As described above, the ultrasonic measurement apparatus 1A of the present embodiment can compare the signal intensity of a waveform part corresponding to a first propagation mode among the several propagation modes of plate waves UW and the signal intensity of a waveform part corresponding to a second propagation mode among the several propagation modes, with each other, and can estimate a property/state of the ultrasonic-wave propagation medium of the test object 100 on the basis of a result of the comparison with high accuracy, like Embodiment 1 as described above. Particularly, it is possible to estimate a property/state of the interlayer portion 102 in the test object 100 (including a property/state of a region between the first member 101 and the second member 103) with high accuracy. Such estimation has been difficult by a visual inspection and an impact-echo method.

Further, because the ultrasonic measurement apparatus 1A is configured to be capable of specifying an inspection mode suitable for the measurement conditions from among the several types of preset inspection modes, the property/state of the interlayer portion 102 can be estimated more correctly.

As described above, various embodiments according to the present invention have been described with reference to the drawings. Those embodiments exemplify the present invention, and various embodiments other than those embodiments can also be implemented. Within the scope of the present invention, any combinations of the above-described embodiments, an modification to any component of each embodiment, or an omission of any component from each embodiment can be made.

INDUSTRIAL APPLICABILITY

Because an ultrasonic measurement apparatus and ultrasonic measurement method according to the present invention make it possible to detect plate waves of multiple modes which propagate through the inside of a test object, and nondestructively measure a property/state of the test object, the ultrasonic measurement apparatus and ultrasonic measurement method are suitable for use in nondestructive testing for examining the presence or absence, existence position, size, shape or distribution of an abnormal portion in the test object.

REFERENCE SIGNS LIST 1, 1A: ultrasonic measurement apparatuses; 10, 10A: signal processors; 11, 11A: ultrasonic controllers; 12, 12A: intensity detectors; 13: estimator; 14: output controller; 16: memory; 17: display interface unit (display I/F unit); 18: input interface unit (input I/F unit); 20: transmitter; 21: transducer probe; 31: receiver probe; 21$t$, 31$t$: vibrators; 21$b$, 31$b$: wedges; 22: signal generator; 23, 32: amplifiers; 30: receiver; 33: A/D converter; 40: display device; 41: manual input device; 50: information processing device; 51: processor; 52: ROM (Read Only Memory); 53: RAM (Random Access Memory); 54: recording medium; 55: transmitter/receiver interface circuit (transmitter/receiver I/F circuit); 56: display interface circuit (display I/F circuit); 57: signal path; 100: test object; 101: first member; 102: interlayer portion; 103: second member; 103$s$: surface; and UW: plate wave.

The invention claimed is:

1. An ultrasonic measurement apparatus for estimating a property or state of a test object that has a pair of boundary faces extending in a longitudinal direction of the test object and allows an ultrasonic wave injected into a region between the pair of boundary faces to propagate along the pair of boundary faces as plate waves of propagation modes, the ultrasonic measurement apparatus comprising:
 a receiver configured to receive a detected signal obtained by detecting the plate waves to output a received signal indicating a time-domain waveform of the detected signal; and
 signal processing circuitry configured to:
 detect, from the received signal, a first amplitude or energy of a first waveform part appearing in a first gate period prescribed on a basis of group-velocity dispersion of a first propagation mode that is one of the propagation modes;
 detect, from the received signal, a second amplitude or energy of a second waveform part appearing in a second gate period prescribed on a basis of group-velocity dispersion of a second propagation mode that is another one of the propagation modes;
 make a comparison between the first amplitude or energy of the first waveform part and the second amplitude or energy of the second waveform part;
 calculate, as a result of the comparison, a ratio between the first amplitude or energy of the first waveform part and the second amplitude or energy of the second waveform part; and
 estimate the property or state of the test object on a basis of a direct comparison of the result of the comparison to a threshold corresponding to the amplitude ratio or energy ratio, in order to determine whether an interlayer portion of the test object is immersed in water or is an air layer.

2. The ultrasonic measurement apparatus according to claim 1, further comprising a transmitter configured to supply an excitation signal to a transducer probe that is one of a pair of angle-beam probes arranged to face each other on a surface of the test object, thereby to generate the ultrasonic wave in the transducer probe, wherein the receiver receives the detected signal from a receiver probe that is another one of the pair of angle-beam probes, and
the signal processing circuitry estimates the property or state of a propagation path of the ultrasonic wave in the test object, the propagation path extending from the transducer probe to the receiver probe.

3. The ultrasonic measurement apparatus according to claim 1, wherein the first propagation mode is an anti-symmetric mode, and the second propagation mode is a symmetric mode having a group velocity lower than that of the first propagation mode.

4. The ultrasonic measurement apparatus according to claim 1, wherein the first propagation mode is a symmetric mode, and the second propagation mode is an anti-symmetric mode having a group velocity lower than that of the first propagation mode.

5. The ultrasonic measurement apparatus according to claim 1, wherein the first propagation mode is a symmetric mode having a first frequency, the second propagation mode is a symmetric mode having a second frequency different from the first frequency, and the first propagation mode has a group velocity different from that of the second propagation mode.

6. The ultrasonic measurement apparatus according to claim 1, wherein:
 one of the pair of boundary faces is a surface of the test object;
 another one of the pair of boundary faces exists in a boundary portion between two layers that constitute the test object; and
 the signal processing circuitry estimates the property or state of the boundary portion on a basis of the result of the comparison and the threshold.

7. The ultrasonic measurement apparatus according to claim 1, wherein the signal processing circuitry further controls a display device to display at least one of the time-domain waveform and the estimated property or state.

8. An ultrasonic measurement method which is executed in an ultrasonic measurement apparatus for estimating a property or state of a test object that has a pair of boundary faces extending in a longitudinal direction of the test object and allows an ultrasonic wave injected into a region between the pair of boundary faces to propagate along the pair of boundary faces as plate waves of propagation modes, the ultrasonic measurement method comprising:
 receiving a detected signal obtained by detecting the plate waves to output a received signal indicating a time-domain waveform of the detected signal;
 detecting, from the received signal, a first amplitude or energy of a first waveform part appearing in a first gate period prescribed on a basis of group-velocity dispersion of a first propagation mode that is one of the propagation modes;
 detecting, from the received signal, a second amplitude or energy of a second waveform part appearing in a second gate period prescribed on a basis of group-velocity dispersion of a second propagation mode that is another one of the propagation modes;
 making a comparison between the first amplitude or energy of the first waveform part and the second amplitude or energy of the second waveform part;
 calculating, as a result of the comparison, a ratio between the first amplitude or energy of the first waveform part and the second amplitude or energy of the second waveform part; and estimating the property or state of the test object on a basis of a direct comparison of the result of the comparison to a threshold corresponding to the amplitude ratio or energy ratio, in order to determine whether an interlayer portion of the test object is immersed in water or is an air layer.

9. The ultrasonic measurement method according to claim 8, wherein the first propagation mode is an anti-symmetric mode, and the second propagation mode is a symmetric mode having a group velocity lower than that of the first propagation mode.

10. The ultrasonic measurement method according to claim 8, wherein the first propagation mode is a symmetric mode, and the second propagation mode is an anti-symmetric mode having a group velocity lower than that of the first propagation mode.

11. The ultrasonic measurement method according to claim 8, wherein the first propagation mode is a symmetric mode having a first frequency, the second propagation mode is a symmetric mode having a second frequency different from the first frequency, and the first propagation mode has a group velocity different from that of the second propagation mode.

12. The ultrasonic measurement method according to claim 8, wherein:
   one of the pair of boundary faces is a surface of the test object;
   another one of the pair of boundary faces exists in a boundary portion between two layers that constitute the test object; and
   the property or state of the boundary portion is estimated as the property or state of the test object.

* * * * *